United States Patent
Yamashita

(10) Patent No.: US 11,199,241 B2
(45) Date of Patent: Dec. 14, 2021

(54) DAMPER

(71) Applicant: Hitachi Automotive Systems, Ltd., Ibaraki (JP)

(72) Inventor: Mikio Yamashita, Zama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 38 days.

(21) Appl. No.: 16/491,657

(22) PCT Filed: Feb. 23, 2018

(86) PCT No.: PCT/JP2018/006759
§ 371 (c)(1),
(2) Date: Sep. 6, 2019

(87) PCT Pub. No.: WO2018/163868
PCT Pub. Date: Sep. 13, 2018

(65) Prior Publication Data
US 2020/0003272 A1    Jan. 2, 2020

(30) Foreign Application Priority Data
Mar. 10, 2017  (JP) .............................. JP2017-046270

(51) Int. Cl.
*F16F 9/50* (2006.01)
*F16F 9/32* (2006.01)
*F16F 9/43* (2006.01)

(52) U.S. Cl.
CPC .............. *F16F 9/50* (2013.01); *F16F 9/3235* (2013.01); *F16F 9/437* (2013.01)

(58) Field of Classification Search
CPC .... F16F 9/50; F16F 9/34; F16F 9/3405; F16F 9/348; F16F 9/3481; F16F 9/3482; F16F 9/3235; F16F 9/437
See application file for complete search history.

(56) References Cited

U.S. PATENT DOCUMENTS 6,860,370 B2 *  3/2005  Nakadate .............. F16F 9/3485
                                                                     188/282.5
8,042,661 B2 * 10/2011  Ota ....................... F16F 9/3485
                                                                    188/322.15
(Continued)

FOREIGN PATENT DOCUMENTS

DE   10 2016 010 727 A1    3/2017
DE   11 2012 004 968 B4   10/2019
JP        2011-202800 A   10/2011

OTHER PUBLICATIONS

International Search Report of PCT/JP2018/006759 dated Apr. 10, 2018.

(Continued)

*Primary Examiner* — Vishal R Sahni
(74) *Attorney, Agent, or Firm* — Mattingly & Malur, P.C.

(57) ABSTRACT

A damper includes a first passage and a second passage in parallel, a first damping force generation mechanism of the first passage, a case member in which a portion of the second passage is formed, an annular disc disposed to face a bottom part in the case member to be able to be bent by a working fluid in the case member, a first chamber communicating with a first cylinder chamber and a second chamber communicating with a second cylinder chamber which are provided by the disc partitioning the inside of the case member, a first through hole provided in the bottom part of the case member to communicate with the second chamber, a bypass passage provided in parallel to the first through hole and configured to allow communication between the first chamber and the second cylinder chamber, and a second damping force generation mechanism provided in the bypass passage.

12 Claims, 11 Drawing Sheets

(56) References Cited

U.S. PATENT DOCUMENTS

| | | | | |
|---|---|---|---|---|
| 9,534,653 B2* | 1/2017 | Kim | ...................... | F16F 9/5126 |
| 9,739,332 B2* | 8/2017 | Kim | ...................... | F16F 9/3481 |
| 9,976,622 B2* | 5/2018 | Kim | .......................... | F16F 9/46 |
| 10,001,189 B2* | 6/2018 | Kim | ...................... | F16F 9/3488 |
| 2003/0094340 A1* | 5/2003 | Dodge | .................... | F16F 9/512 |
| | | | | 188/282.6 |
| 2011/0214953 A1 | 9/2011 | Maeda et al. | | |
| 2014/0252735 A1 | 9/2014 | Yamashita et al. | | |
| 2015/0041264 A1* | 2/2015 | Goldasz | ................ | F16F 9/3484 |
| | | | | 188/313 |
| 2015/0323037 A1* | 11/2015 | De Kock | ................ | F16F 9/185 |
| | | | | 188/313 |
| 2017/0082169 A1 | 3/2017 | Kim | | |
| 2018/0080520 A1* | 3/2018 | Tsuji | ........................ | F16F 9/44 |

OTHER PUBLICATIONS

Written Opinion of PCT/JP2018/006759 dated Apr. 10, 2018.
German Office Action received in corresponding German Application No. 11 2018 001 280.8 dated Jul. 20, 2021.

* cited by examiner

DAMPER

TECHNICAL FIELD

The present invention relates to a damper.
Priority is claimed on Japanese Patent Application No. 2017-046270, filed Mar. 10, 2017, the content of which is incorporated herein by reference.

BACKGROUND ART

As a damper, there is one in which a damping force is variable in response to a frequency (see, for example, Patent Document 1).

CITATION LIST

Patent Literature

[Patent Document 1]
Japanese Unexamined Patent Application, First Publication No. 2011-202800

SUMMARY OF INVENTION

Technical Problem

In a damper, miniaturization is required.
Accordingly, the present invention provides a damper that can be miniaturized.

Solution to Problem

A damper according to one aspect of the present invention includes a first passage in which a working fluid flows out from one cylinder chamber due to movement of a piston, a second passage provided in parallel to the first passage, a first damping force generation mechanism provided in the first passage to generate a damping force, an annular case member having a bottomed cylindrical shape which penetrates a shaft-shaped member and has at least a portion of the second passage formed inside, an annular disc which penetrates the shaft-shaped member and is disposed to face a bottom part of the case member in the case member to be able to be bent by the working fluid in the case member, a first chamber communicating with a first cylinder chamber and a second chamber communicating with a second cylinder chamber which are provided by the disc partitioning the inside of the case member, a first through hole provided in the bottom part of the case member and configured to communicate with the second chamber, a bypass passage provided in parallel to the first through hole and configured to allow communication between the first chamber and the second cylinder chamber, and a second damping force generation mechanism provided in the bypass passage and configured to open a valve thereof when a pressure inside the first chamber reaches a predetermined pressure to generate a damping force.

Advantageous Effects of Invention

According to the above-described aspect, miniaturization of the damper can be achieved.

DESCRIPTION OF EMBODIMENTS

First Embodiment

Figure 1:
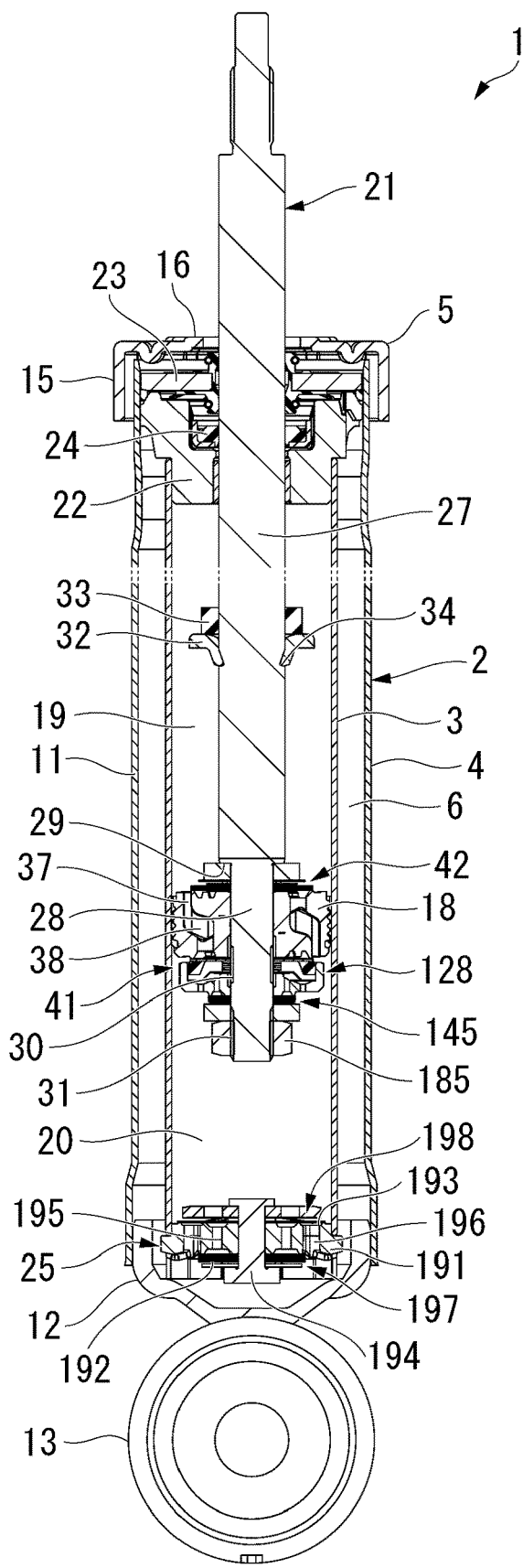
FIG. 1 is a cross-sectional view showing a damper of a first embodiment of the present invention.

A first embodiment according to the present invention will be described on the basis of FIGS. 1 to 6. Hereinafter, for convenience of description, an upper side in the drawing is referred to as "upper" and a lower side in the drawing is referred to as "lower."
As shown in FIG. 1, a damper 1 of the first embodiment is a so-called dual-tube type hydraulic damper and includes a cylinder 2 in which an oil fluid (not shown) is sealed as a working fluid. The cylinder 2 includes a cylindrical inner cylinder 3, a bottomed cylindrical outer cylinder 4 having a diameter larger than that of the inner cylinder 3 and concentrically provided to cover the inner cylinder 3, and a cover 5 provided to cover an upper opening side of the outer cylinder 4, and a reservoir chamber 6 is formed between the inner cylinder 3 and the outer cylinder 4.
The outer cylinder 4 is configured of a cylindrical barrel member 11 and a bottom member 12 fitted and fixed to a lower side of the barrel member 11 and configured to close a lower portion of the barrel member 11. A mounting eye 13 is fixed to the bottom member 12 on an outer side opposite to the barrel member 11.
The cover 5 includes a cylindrical part 15 and an inner flange part 16 extending radially inward from an upper end side of the cylindrical part 15. The cover 5 covers the barrel member 11 so that an upper end opening of the barrel member 11 is covered with the inner flange part 16 and an outer circumferential surface of the barrel member 11 is covered with the cylindrical part 15, and in this state, a portion of the cylindrical part 15 is swaged radially inward and fixed to the barrel member 11.

The damper 1 includes a piston 18 slidably fitted in the inner cylinder 3 of the cylinder 2. The piston 18 partitions the inside of the inner cylinder 3 into two chambers, an upper chamber 19 (a first cylinder chamber) and a lower chamber 20 (a second cylinder chamber). An oil fluid is sealed as a working fluid in the upper chamber 19 and the lower chamber 20 of the inner cylinder 3, and an oil fluid and a gas are sealed as working fluids in the reservoir chamber 6 between the inner cylinder 3 and outer cylinder 4.

The damper 1 includes a piston rod 21 (a shaft-shaped member) in which one end side is disposed in the inner cylinder 3 of the cylinder 2 and connected to the piston 18 and the other end side extends to the outside of the cylinder 2. The piston 18 and the piston rod 21 move together. The piston 18 moves to the upper chamber 19 side in an extension stroke in which a protrusion amount of the piston rod 21 from the cylinder 2 increases, and the piston 18 moves to the lower chamber 20 side in a compression stroke in which the protrusion amount of the piston rod 21 from the cylinder 2 decreases.

A rod guide 22 is fitted to an upper end opening side of the inner cylinder 3 and the outer cylinder 4, and a seal member 23 is mounted on the outer cylinder 4 on an upper side which is an outer side of the cylinder 2 with respect to the rod guide 22. A friction member 24 is provided between the rod guide 22 and the seal member 23. The rod guide 22, the seal member 23, and the friction member 24 are all annular, and the piston rod 21 is slidably inserted into the insides of the rod guide 22, the friction member 24, and the seal member 23 to extend from the inside to the outside of the cylinder 2.

The rod guide 22 guides movement of the piston rod 21 by supporting the piston rod 21 to be movable in an axial direction while restricting its movement in a radial direction. The seal member 23 is in close contact with the outer cylinder 4 at its outer circumferential portion and is in sliding contact with an outer circumferential portion of the piston rod 21 moving in the axial direction at its inner circumferential portion to prevent an oil fluid in the inner cylinder 3 and a high-pressure gas and an oil fluid of the reservoir chamber 6 in the outer cylinder 4 from leaking to the outside. The friction member 24 is in sliding contact with the outer circumferential portion of the piston rod 21 at its inner circumferential portion to cause the piston rod 21 to generate frictional resistance. Further, the friction member 24 is not for the purpose of sealing.

The rod guide 22 has an outer circumferential portion formed in a stepped shape in which an upper portion has a larger diameter than a lower portion, and the lower portion having a small diameter is fitted to an inner circumferential portion of an upper end of the inner cylinder 3 while the upper portion having a large diameter is fitted to an inner circumferential portion of an upper portion of the outer cylinder 4. A base valve 25 which partitions the lower chamber 20 and the reservoir chamber 6 is installed on the bottom member 12 of the outer cylinder 4, and an inner circumferential portion of a lower end of the inner cylinder 3 is fitted to the base valve 25. A portion (not shown) of an upper end portion of the outer cylinder 4 is swaged radially inward, and the swaged portion and the rod guide 22 sandwich the seal member 23.

The piston rod 21 includes a main shaft part 27 and an attaching shaft part 28 (shaft part) which is smaller in diameter than the main shaft part 27. The attaching shaft part 28 is disposed in the cylinder 2 and the piston 18 and the like are attached thereto. An end portion of the main shaft part 27 on the attaching shaft part 28 side is a shaft step part 29 which extends in a direction perpendicular to the axial direction. On an outer circumferential portion of the attaching shaft part 28, a passage groove 30 extending in the axial direction is formed at an intermediate position thereof in the axial direction, and a male screw 31 is formed at a distal end position thereof on a side opposite to the main shaft part 27 in the axial direction. A plurality of passage grooves 30 are formed at intervals in a circumferential direction of the attaching shaft part 28, and a cross-sectional shape thereof in a plane perpendicular to a central axis of the piston rod 21 is formed to be in any of a rectangle, square, or D shape.

A stopper member 32 and a buffer 33, both of which are annular, are provided in the piston rod 21 at a portion between the piston 18 of the main shaft part 27 and the rod guide 22. The stopper member 32 allows the piston rod 21 to be inserted through an inner circumferential side thereof and is swaged to be fixed to a fixing groove 34 which is recessed inward in the radial direction of the main shaft part 27. The buffer 33 also allows the piston rod 21 to be inserted through an inside thereof and is disposed between the stopper member 32 and the rod guide 22.

In the damper 1, for example, a protruding portion of the piston rod 21 from the cylinder 2 may be disposed on an upper side thereof to be supported by a vehicle body, and the mounting eye 13 on the cylinder 2 side may be disposed on a bottom side thereof to be connected to a wheel side. Conversely, the cylinder 2 side may be supported by a vehicle body, and the piston rod 21 may be connected to a wheel side. When a wheel vibrates during travel, although relative positions of the cylinder 2 and the piston rod 21 change according to the vibration, the change is suppressed by fluid resistance of a flow passage formed in at least one of the piston 18 and the piston rod 21. As will be described in detail below, the fluid resistance of the flow passage formed in at least one of the piston 18 and the piston rod 21 is made different depending on a speed and amplitude of the vibration, and ride comfort is improved by suppressing the vibration. In addition to vibration generated by a wheel, an inertial force or a centrifugal force generated in a vehicle body during travel of the vehicle also acts between the cylinder 2 and the piston rod 21. For example, a centrifugal force is generated in a vehicle body when a traveling direction is changed by a steering wheel operation, and a force based on the centrifugal force acts between the cylinder 2 and the piston rod 21. As will be described below, the damper 1 has satisfactory properties against vibration based on a force generated in the vehicle body during travel of the vehicle, and high stability in vehicle travel can be obtained.

Figure 2:
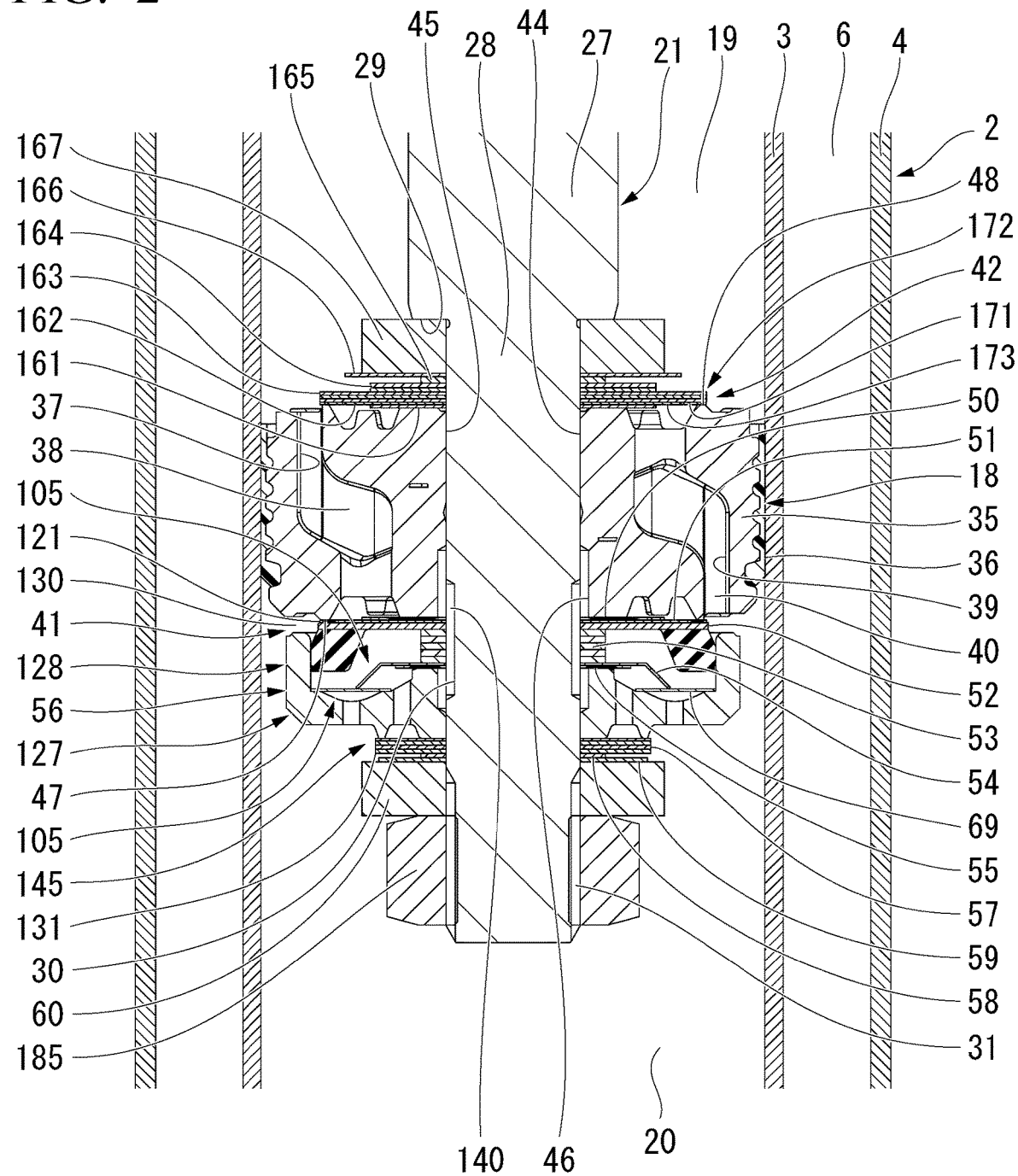
FIG. 2 is a partial cross-sectional view showing surroundings of a piston of the damper of the first embodiment of the present invention.

As shown in FIG. 2, the piston 18 is constituted by a piston main body 35 made of a metal and supported by the piston rod 21, and an annular slide member 36 made of a synthetic resin and integrally mounted on an outer circumferential surface of the piston main body 35 to slide in the inner cylinder 3.

The piston main body 35 includes a plurality of (only one is shown in FIG. 2 because it is a cross section) passage holes 37 that allow the upper chamber 19 and the lower chamber 20 to communicate with each other, and a plurality of (only one is shown in FIG. 2 because it is a cross section) passage holes 39 that allow the upper chamber 19 and the lower chamber 20 to communicate with each other. The plurality of passage holes 37 are formed at equal pitches with one of each of the passage holes 39 interposed therebetween in the circumferential direction of the piston main body 35 and constitute one half of the passage holes 37 and 39 in number. The plurality of passage holes 37 open radially outward at one side (the upper side in FIG. 2) in the axial direction of the piston 18 and open radially inward at the other side (the lower side in FIG. 2) in the axial direction of the piston 18.

A damping force generation mechanism 41 (a first damping force generation mechanism) that opens and closes passage portions 38 to generate a damping force is provided in the passage portions 38 in the passage holes 37. The damping force generation mechanism 41 is disposed on the lower chamber 20 side in the axial direction, which is one end side of the piston 18 in the axial direction, to be attached to the piston rod 21. Since the damping force generation mechanism 41 is disposed on the lower chamber 20 side, a plurality of passage portions 38 serve as a passage through which the oil fluid flows as a working fluid out of the upper chamber 19 on one side to the lower chamber 20 on the other side when the piston 18 moves to the upper chamber 19 side, that is, in the extension stroke. The damping force generation mechanism 41 provided with respect to these passage portions 38 is an extension-side damping force generation mechanism that generates a damping force by inhibiting flow of the oil fluid from the passage portions 38 on the extension side to the lower chamber 20.

The passage holes 39 constituting the remaining half shown in FIG. 2 are formed at equal pitches with one of each of the passage holes 37 interposed therebetween in the circumferential direction, and open radially outward at the other side (the lower side in FIG. 2) in the axial direction of the piston 18 and open radially inward at one side (the upper side in FIG. 2) in the axial direction of the piston 18.

Also, a damping force generation mechanism 42 that opens and closes passage portions 40 to generate a damping force is provided in the passage portions 40 in the passage holes 39. The damping force generation mechanism 42 is disposed on the upper chamber 19 side in the axial direction, which is the other end side of the piston 18 in the axial direction, to be attached to the piston rod 21. Since the damping force generation mechanism 42 is disposed on the upper chamber 19 side, a plurality of passage portions 40 serve as a passage through which the oil fluid flows out from the lower chamber 20 to the upper chamber 19 when the piston 18 moves to the lower chamber 20 side, that is, in the compression stroke. The damping force generation mechanism 42 provided with respect to these passage portions 40 is a compression-side damping force generation mechanism that generates a damping force by inhibiting flow of the oil fluid from the passage portions 40 on the compression side to the upper chamber 19.

As described above, the passage portions 38 in the plurality of passage holes 37 and the passage portions 40 in the plurality of passage holes 39 allow the upper chamber 19 and the lower chamber 20 to communicate with each other so that the oil fluid, which is a working fluid, flows therebetween due to movement of the piston 18, in which the passage portions 38 allow the oil fluid to pass therethrough when the piston rod 21 and the piston 18 move to the extension side (the upper side in FIG. 2), and the passage portions 40 allow the oil fluid to pass therethrough when the piston rod 21 and the piston 18 move to the compression side (the lower side in FIG. 2).

The piston main body 35 has substantially a disc shape, and an insertion hole 44 which penetrates in the axial direction and through which the attaching shaft part 28 of the piston rod 21 is inserted is formed at a center in the radial direction thereof. The insertion hole 44 includes a small diameter hole portion 45 on one side in the axial direction into which the attaching shaft part 28 of the piston rod 21 is fitted, and a large diameter hole portion 46 on the other side in the axial direction having a larger diameter than the small diameter hole portion 45.

At an end portion of the piston main body 35 on the lower chamber 20 side in the axial direction, an annular valve seat part 47 constituting a portion of the damping force generation mechanism 41 is formed on a radial outer side of the openings of the passage holes 37 on the lower chamber 20 side. In the insertion hole 44, the large diameter hole portion 46 is provided on the valve seat part 47 side in the axial direction with respect to the small diameter hole portion 45. Also, at an end portion of the piston main body 35 on the upper chamber 19 side in the axial direction, an annular valve seat part 48 constituting a portion of the damping force generation mechanism 42 is formed on a radial outer side of the openings of the passage holes 39 on the upper chamber 19 side.

In the piston main body 35, a side of the valve seat part 47 opposite to the insertion hole 44 has a stepped shape of which a height in the axial direction is lower than that of the valve seat part 47, and the openings on the lower chamber 20 side of the passage portions 40 in the compression-side passage holes 39 are disposed in the step shaped portion. Similarly, in the piston main body 35, a side of the valve seat part 48 opposite to the insertion hole 44 has a stepped shape of which a height in the axial direction is lower than that of the valve seat part 48, and the openings on the upper chamber 19 side of the passage portions 38 in the extension-side passage holes 37 are disposed in the step shaped portion.

Figure 3:
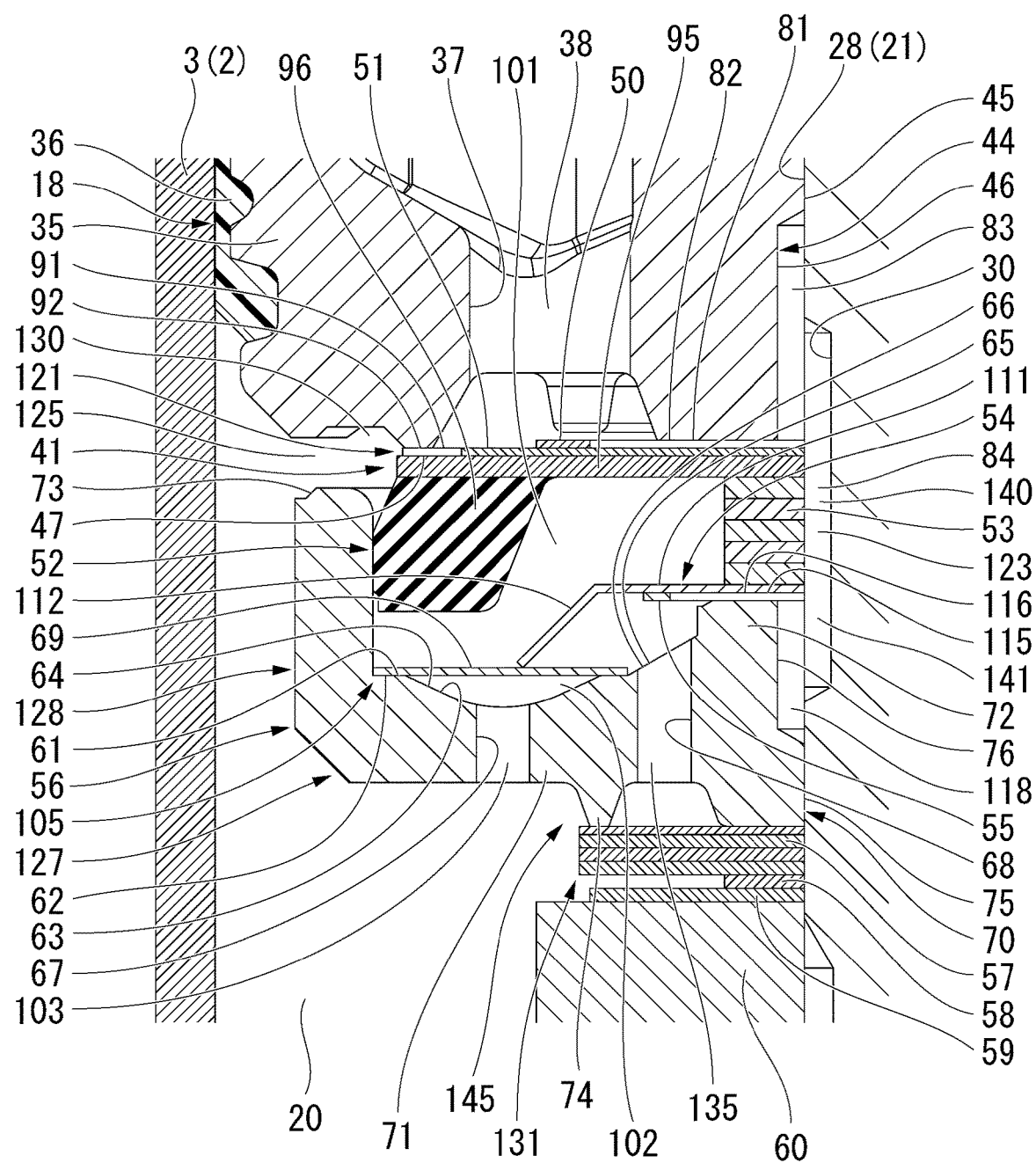
FIG. 3 is a partial cross-sectional view showing surroundings of a valve mechanism of the damper of the first embodiment of the present invention.

As shown in FIG. 3, one disc 50, one disc 51, one pilot valve 52, a plurality of discs 53, one spring disc 54 (spring means), one disc 55, one case member 56, a plurality of discs 57, one disc 58, one disc 59, and an annular member 60 are provided on the valve seat part 47 side of the piston 18 in order from the piston 18 side in the axial direction with the attaching shaft part 28 of the piston rod 21 fitted into the insides thereof. The discs 50, 51, 53, 55, and 57 to 59, the spring disc 54, the case member 56, and the annular member 60 are all made of a metal. The discs 50, 51, 53, 55, and 57 to 59 and the annular member 60 are all formed in a bored circular flat plate shape having certain thicknesses into which the attaching shaft part 28 of the piston rod 21 can be fitted. The spring disc 54, the pilot valve 52, and the case member 56 are all formed in an annular shape into which the attaching shaft part 28 of the piston rod 21 can be fitted.

The case member 56 has a bottomed cylindrical shape, is annular, and includes a bored disc type bottom part 71 in which a through hole 70 penetrating in a thickness direction is formed, a cylindrical inner cylindrical part 72 which protrudes on both sides of the bottom part 71 in the axial direction from an inner circumferential edge portion of the bottom part 71, a cylindrical outer cylindrical part 73 which protrudes to one side of the bottom part 71 in the axial direction from an outer circumferential edge portion of the bottom part 71, and an annular valve seat part 74 which protrudes to a side of the bottom part 71 opposite to the outer cylindrical part 73 in the axial direction from an intermediate position in the radial direction of the bottom part 71. The amount of protrusion of the outer cylindrical part 73 from the bottom part 71 is larger than the amount of protrusion of the inner cylindrical part 72 on the outer cylindrical part 73 side. The case member 56 is penetrated by the attaching shaft part 28 of the piston rod 21 in the through hole 70.

In the bottom part 71, a disc contact part 62 having a flat annular seat surface 61 perpendicular to a central axis is formed in the axial direction of the bottom part 71 and on the outer cylindrical part 73 side in the radial direction, and an annular recess 64 having a stopper surface 63 recessed in the axial direction from the seat surface 61 is formed at an intermediate position in the radial direction of the disc contact part 62. The recess 64 has a shape in which the width in the radial direction becomes smaller as the depth increases, and a cross section of the stopper surface 63 in a plane including the central axis of the bottom part 71 has a constant arc shape regardless of a circumferential position.

In the bottom part 71, a tapered part 66 having a tapered surface 65 whose height from the seat surface 61 increases inward in the radial direction is formed on an inner side of the disc contact part 62 in the radial direction on the outer cylindrical part 73 side in the axial direction. The tapered part 66 is provided at an end portion on the inner cylindrical part 72 side in the radial direction of the bottom part 71. The bottom part 71, the inner cylindrical part 72, the outer cylindrical part 73, the valve seat part 74, the disc contact part 62, the recess 64, and the tapered part 66 are coaxially disposed, and their central axes are the same as the central axis of the case member 56.

A through hole 67 (a first through hole) penetrating in the axial direction of the bottom part 71 is formed in the bottom part 71 at a deepest bottom position of the recess 64, that is, at a central position of a radial width of the recess 64. A plurality of (only one is shown in FIG. 3 because it is a partial cross section) through holes 67 are formed in the bottom part 71 at intervals in the circumferential direction of the bottom part 71. Further, it is sufficient if at least one through hole 67 is provided in the bottom part 71. The through holes 67 are disposed on a side outward from the valve seat part 74 in the radial direction of the bottom part 71.

In the case member 56, an annular disc 69 is disposed to face the bottom part 71 of the case member 56 in the case member 56. The disc 69 is a flat plate made of a metal, of which an outer diameter is slightly smaller than a maximum diameter of the seat surface 61 of the disc contact part 62, in other words, an inner diameter of the outer cylindrical part 73, and larger than a maximum diameter of the stopper surface 63, and an inner diameter is slightly larger than a minimum diameter of the seat surface 61 of the disc contact part 62 and smaller than a minimum diameter of the stopper surface 63. Thereby, the disc 69 can be moved in the axial direction while being guided by the outer cylindrical part 73 so that radial movement is restricted and is configured to be in surface contact with the seat surface 61 to cover an entire stopper surface 63. The disc 69 is penetrated by the attaching shaft part 28 of the piston rod 21.

The through hole 67 formed at the deepest position of the recess 64 of the bottom part 71 is provided to be aligned with the disc 69 in the radial direction and to face the disc 69 in the axial direction. The disc 69 closes the through hole 67 by being in surface contact with the seat surface 61 and opens the through hole 67 by being separated from the seat surface 61. Also, the disc 69 can be elastically deformed to enter the recess 64, and at that time, the disc 69 is in contact with boundary peripheral edge portions between the stopper surface 63 and the seat surface 61 on both sides in the radial direction or with an entire surface of the stopper surface 63 to keep the through hole 67 in a closed state.

In the bottom part 71, a through hole 68 (a second through hole) penetrating in the axial direction of the case member 56 is formed at an intermediate position of the tapered part 66 in the radial direction. A plurality of (only one is shown in FIG. 3 because it is a partial cross section) through holes 68 are formed at intervals in the circumferential direction of the bottom part 71. The through holes 68 are disposed between the valve seat part 74 and the inner cylindrical part 72 in the radial direction of the bottom part 71. Thereby, the through holes 67 are provided on a side outward from the through holes 68 in the radial direction of the case member 56, that is, in the radial direction of the bottom part 71.

In the through hole 70 on an inner circumference of the inner cylindrical part 72, a small diameter hole portion 75 into which the attaching shaft part 28 of the piston rod 21 is fitted is formed on the valve seat part 74 side in the axial direction, and a large diameter hole portion 76 having a diameter larger than that of the small diameter hole portion 75 is formed on a side opposite to the valve seat part 74 in the axial direction. As a result of the outer cylindrical part 73 protruding further than the inner cylindrical part 72 from the bottom part 71, the attaching shaft part 28 penetrating the inner cylindrical part 72 in the axial direction and extending on both sides has a portion disposed in the case member 56 in the axial direction.

The disc 50 has an outer diameter smaller than an inner diameter of the valve seat part 47. The disc 50 is formed with a notch 81 extending radially outward from an inner circumferential edge portion thereof that is fitted to the attaching shaft part 28 of the piston rod 21. A passage portion 82 (an introduction orifice) in the notch 81 is in constant communication with the passage portion 38 of the piston 18, and the passage portion 38 is in constant communication with a passage portion 83 between the large diameter hole portion 46 of the piston 18 and the attaching shaft part 28 and with a passage portion 84 in the passage groove 30 of the piston rod 21 through the passage portion 82 in the notch 81.

The disc 51 has an outer diameter larger than an outer diameter of the valve seat part 47 of the piston 18. The disc 51 is in contact with the valve seat part 47 and opens and closes an opening of the passage portion 38 in the passage hole 37 formed in the piston 18 by being separated from and coming in contact with the valve seat part 47. The disc 51 includes a notch 91 formed on an outer circumferential side thereof, and the notch 91 traverses the valve seat part 47 in the radial direction. Therefore, the inside of the notch 91 is a fixed orifice 92 which allows constant communication between the passage portion 38 and the lower chamber 20.

The pilot valve 52 is constituted by a metallic disc 95 and a rubber seal member 96 fixed to the disc 95. The disc 95 has a bored circular flat plate shape having a certain thickness in which the attaching shaft part 28 of the piston rod 21 can be fitted inside and has an outer diameter slightly larger than an outer diameter of the disc 51. The seal member 96 is fixed to an outer circumferential side of the disc 95 on a side opposite to the piston 18 and has an annular shape. In other words, the pilot valve 52 includes the annular seal member 96 at an outer circumferential portion thereof.

The seal member 96 is slidably fitted in a liquid-tight manner to an inner circumferential surface of the outer cylindrical part 73 of the case member 56 over the entire circumference and constantly seals a gap between the pilot valve 52 and the outer cylindrical part 73. In other words, the pilot valve 52 causes the seal member 96 to be slidably and closely fitted to the outer cylindrical part 73 of the case member 56.

In a state in which the disc 69 closes a passage portion 103 in the through hole 67, a space between the pilot valve 52, the case member 56, and the disc 69 forms a back-pressure chamber 101 (a first chamber) communicating with the upper chamber 19, and a space between the bottom part 71 of the case member 56 and the disc 69 forms a varying chamber 102 (a second chamber) communicating with the lower chamber 20. Therefore, both the back-pressure chamber 101 and the varying chamber 102 are provided by the disc 69 partitioning the case member 56. The varying chamber 102 communicates with the passage portion 103 in the through hole 67 and is in constant communication with the lower chamber 20 through the passage portion 103 in the through hole 67.

The disc 69 blocks flow of the oil fluid between the back-pressure chamber 101 and the varying chamber 102 in a state in which both the inner circumferential side and the outer circumferential side thereof are in contact with the seat surface 61 of the disc contact part 62 over the entire circumference, in a state in which the inner circumferential side and the outer circumferential side thereof are both in contact with the boundary edge portions between the seat surface 61 and the stopper surface 63 over the entire circumference, and in a state in which the disc 69 is in contact with the stopper surface 63 over the entire circumference. Also, the disc 69 allows the oil fluid to flow between the back-pressure chamber 101 and the varying chamber 102 in a state in which it is separated from the bottom part 71. The spring disc 54 biases the disc 69 to be in contact with the seat surface 61 and thereby constitutes a check valve 105 which allows flow of the oil fluid from the varying chamber 102 side, that is, the lower chamber 20 side, to the back-pressure chamber 101 side while the spring disc 54, the disc 69, and the disc contact part 62 and the recess 64 of the case member 56 restrict flow of the oil fluid from the back-pressure chamber 101 side to the varying chamber 102 side, that is, the lower chamber 20.

The disc 69, which is a valve body of the check valve 105, is not clamped in its entirety in the axial direction and is not fixed to any part. The disc 69 can come in contact with and be separated from the spring disc 54 and the bottom part 71 of the case member 56 which are in contact therewith. The disc 69 is of a floating type free valve which is axially movable in its entirety. With the spring disc 54 being the only bias other than a hydraulic pressure, the disc 69 moves toward and away from the seat surface 61. The disc 69 and the spring disc 54 of the check valve 105 are both made of a metal only and do not use a rubber seal. Both the disc 69 and the spring disc 54 are integrally formed by press processing.

Further, a biasing force of the spring disc 54 may be set such that the disc 69 constantly blocks flow of the oil fluid between the back-pressure chamber 101 and the varying chamber 102 regardless of a pressure state in the back-pressure chamber 101 and the varying chamber 102. That is, the disc 69 may block flow of the working fluid in at least one direction, which may include flows in both directions, between the back-pressure chamber 101 and the varying chamber 102.

Since the recess 64 is formed in the bottom part 71, the disc 69 can be bent by the working fluid in the case member 56, and when a pressure in the back-pressure chamber 101 is higher than a pressure in the varying chamber 102, the disc 69 is bent to enter the recess 64 as described above and deformed such that a volume of the back-pressure chamber 101 is expanded and a volume of the varying chamber 102 is reduced while the communication between the back-pressure chamber 101 and the varying chamber 102 is blocked. Also, from this state, when the pressure difference between the pressure in the back-pressure chamber 101 and the pressure in the varying chamber 102 is reduced, the disc 69 reduces the portion that has entered the recess 64 and is deformed such that the volume of the varying chamber 102 is increased and the volume of the back-pressure chamber 101 is reduced while the communication between the back-pressure chamber 101 and the varying chamber 102 is blocked. Also, when the pressure of the varying chamber 102 is higher than the pressure of the back-pressure chamber 101 beyond the biasing force of the spring disc 54, the disc 69 is separated from the seat surface 61 against the biasing force of the spring disc 54 and allows the varying chamber 102 and the back-pressure chamber 101 to communicate with each other.

The plurality of discs 53 have the same outer diameter as each other and have an outer diameter smaller than a minimum inner diameter of the seal member 96 of the pilot valve 52. Also, the plurality of discs 53 have an outer diameter smaller than an outer diameter of the inner cylindrical part 72 of the case member 56 and larger than the large diameter hole portion 76.

The spring disc 54 includes a flat plate-like base plate 111 having an outer diameter larger than an outer diameter of the disc 53 and smaller than the minimum inner diameter of the seal member 96 of the pilot valve 52, and a pressing plate 112 extending from the base plate 111. The base plate 111 has an annular shape, and the pressing plate 112 extends from an outer circumferential edge portion of the base plate 111 while being inclined toward one side in the axial direction and outward in the radial direction. A plurality of (only one is shown in FIG. 3 because it is a partial cross section) pressing plates 112 are formed at intervals in the circumferential direction of the base plate 111 and extend to the disc 69 side. The spring disc 54 is configured such that the plurality of pressing plates 112 are in contact with a surface of the disc 69 on the pilot valve 52 side to bias the disc 69 to the seat surface 61 side so that the disc 69 is brought into contact with the seat surface 61.

The disc 55 has an outer diameter smaller than the base plate 111 of the spring disc 54 and larger than the outer diameter of the inner cylindrical part 72 of the case member 56. The disc 55 is formed with a notch 115 extending radially outward from the inner circumferential edge portion thereof that is fitted to the attaching shaft part 28 of the piston rod 21. A passage portion 116 (an introduction orifice) in the notch 115 is in constant communication with the back-pressure chamber 101, and the back-pressure chamber 101 is in constant communication with a passage portion 118 between the large diameter hole portion 76 of the case member 56 and the attaching shaft part 28, and with the passage portion 84 in the passage groove 30 of the piston rod 21 through the passage portion 116 in the notch 115.

As described above, the disc 51 can be seated on the valve seat part 47 of the piston 18. The disc 51 and the pilot valve 52 constitute a damping valve 121. The damping valve 121 is provided in the passage portion 38 in the passage hole 37 formed in the piston 18 and generates a damping force by inhibiting flow of the oil fluid caused by sliding of the piston 18 toward the extension side (the upper side in FIG. 3).

The damping valve 121 constitutes a damping force generation mechanism 41 together with the valve seat part 47 of the piston 18. When the disc 51 of the damping valve 121 is separated from the valve seat part 47 and is opened, the damping valve 121 causes the oil fluid from the passage portion 38 to flow to the lower chamber 20 through a passage portion 125 which extends in a radial direction between the piston 18 and the outer cylindrical part 73 of the case member 56. The passage portions 38 formed inside the plurality of passage holes 37, a space between the damping valve 121 and the valve seat part 47, and the passage portion 125 between the piston 18 and the outer cylindrical part 73 of the case member 56 constitute a passage 130 (a first passage), and as shown in FIG. 2, the passage 130 is an extension-side passage through which the oil fluid flows as a working fluid from the upper chamber 19 on one side toward the lower chamber 20 on the other side in the movement of the piston 18 toward the upper chamber 19 side, that is, in the extension stroke. The extension-side damping force generation mechanism 41 constituted by the valve seat part 47 and the damping valve 121 is provided in the passage 130, and a damping force is generated by opening and closing the passage 130 with the damping valve 121 to inhibit flow of the oil fluid.

As shown in FIG. 3, the back-pressure chamber 101 between the pilot valve 52, the case member 56, and the disc 69 applies an internal pressure to the damping valve 121 in a direction of the piston 18, that is, in a valve closing direction in which the disc 51 is seated on the valve seat part 47. Valve opening of the damping valve 121 is adjusted by the pressure of the back-pressure chamber 101. That is, valve opening of the damping force generation mechanism 41 including the damping valve 121 is adjusted by the pressure of the back-pressure chamber 101.

The passage portion 82 in the notch 81 of the disc 51, the passage portion 83 between the large diameter hole portion 46 of the piston 18 and the attaching shaft part 28, the passage portion 84 in the passage groove 30 of the piston rod 21, and the passage portion 116 in the notch 115 of the disc 55 form a back-pressure chamber inflow passage portion 123 which allows the passage portion 38 of the piston 18 and the back-pressure chamber 101 to be in constant communication with each other to introduce the oil fluid from the passage portion 38 to the back-pressure chamber 101.

The case member 56, the disc 50, the damping valve 121, the plurality of discs 53, the spring disc 54, the disc 55, and the disc 69 constitute a mechanism part 127 which includes the back-pressure chamber 101 and the back-pressure chamber inflow passage portion 123 and serves as a valve opening control mechanism which applies a back pressure to the damping valve 121 to control valve opening thereof. The damping force generation mechanism 41 in which the damping valve 121 is included and the mechanism part 127 constitute a valve mechanism 128.

The plurality of discs 57 have the same outer diameter as each other and have an outer diameter slightly larger than an outer diameter of the valve seat part 74. The plurality of discs 57 constitute a disc valve 131 which can be separated from and seated on the valve seat part 74. When the disc valve 131 is separated from the valve seat part 74, the disc valve 131 allows the back-pressure chamber 101 and the lower chamber 20 to communicate with each other through a passage portion 135 (a bypass passage) in the through hole 68 and generates a damping force by inhibiting flow of the oil fluid therebetween. The through hole 68 is provided in the bottom part 71 of the case member 56 to face the disc valve 131. The passage portion 135 is provided in parallel to the first through hole 67 and allows the back-pressure chamber 101 to communicate with the lower chamber 20.

An outer diameter of the disc 58 is smaller than that of the valve seat part 74, and an outer diameter of the disc 59 is the same as that of the valve seat part 74. The annular member 60 has an outer diameter larger than that of the disc valve 131 and the rigidity thereof is higher than that of the disc valve 131. When the disc valve 131 is deformed in an opening direction, the disc 59 and the annular member 60 come into contact with the disc valve 131, and thereby deformation in the opening direction of the disc valve 131 equal to or higher than a specified level is restricted.

The passage portion 38 in the passage hole 37 of the piston 18, the passage portion 82 of the notch 81 of the disc 50, the passage portion 83 between the large diameter hole portion 46 of the piston 18 and the attaching shaft part 28, the passage portion 84 in the passage groove 30 of the piston rod 21, the passage portion 118 between the large diameter hole portion 76 of the case member 56 and the attaching shaft part 28, the passage portion 116 in the notch 115 of the disc 55, the back-pressure chamber 101, the passage portion 135 in the through hole 68, a space between the disc valve 131 and the valve seat part 74, the varying chamber 102, and the passage portion 103 in the through hole 67 constitute a passage 140 (a second passage). Therefore, at least a portion of the passage 140 is formed inside the case member 56 having the back-pressure chamber 101 inside. The passage 140 connects together the upper chamber 19 and the lower chamber 20 through a route different from that of the passage 130.

In the passage 140, the passage portion 38 on the upper chamber 19 side is common to the passage 130, and the lower chamber 20 side of the passage portion 38 is provided in parallel to the passage 130. That is, a parallel passage 141 including the back-pressure chamber inflow passage portion 123, the back-pressure chamber 101, the passage portion 103, and the passage portion 135 of the passage 140 is parallel to the passage portion 125 of the passage 130. In the parallel passage 141, the back-pressure chamber inflow passage portion 123 including the passage portion 82 and the passage portion 116 is provided to allow communication between the passage 130 and the back-pressure chamber 101. The passage portion 82 and the passage portion 116 are introduction orifices provided in the back-pressure chamber inflow passage portion 123 that introduces the oil fluid from the passage 130 to the back-pressure chamber 101, and a plurality of passage portions 82 and passage portions 116 are provided in series in the back-pressure chamber inflow passage portion 123.

The check valve 105 formed by the spring disc 54, the disc 69, and the bottom part 71 of the case member 56 described above is provided in the parallel passage 141 of the passage 140 and allows flow of the oil fluid from the lower chamber 20 to the back-pressure chamber 101 while restricting flow of the oil fluid from the back-pressure chamber 101 to the lower chamber 20.

The disc valve 131 is separated from the valve seat part 74 when a pressure in the back-pressure chamber 101 reaches a predetermined pressure. The disc valve 131, together with the valve seat part 74, constitutes a damping force generation mechanism 145 (second damping force generation mechanism) that opens the valve to generate a damping force when the pressure in the back-pressure chamber 101 reaches a predetermined pressure. The damping force generation mechanism 145 is provided in the parallel passage 141 that is parallel to the passage 130 in the passage 140 and is provided in the passage portion 135 that allows communication between the back-pressure chamber 101 and the lower chamber 20. The damping force generation mechanism 145 is provided outside the case member 56, and the disc valve 131 thereof is disposed to face the bottom part 71. The through hole 68 is provided in the bottom part 71 of the case member 56 to face the disc valve 131 of the damping force generation mechanism 145.

As shown in FIG. 2, the compression-side damping force generation mechanism 42 includes one disc 161, one disc 162, a plurality of discs 163, and a plurality of discs disc 164, one disc 165, one disc 166, and one annular member 167 in order from the piston 18 side in the axial direction.

The discs 161 to 166 and the annular member 167 are made of a metal and are all formed in a bored circular flat plate shape having certain thicknesses into which the attaching shaft part 28 of the piston rod 21 can be fitted.

The disc 161 has an outer diameter smaller than an inner diameter of the valve seat part 48 of the piston 18. The disc 162 has an outer diameter slightly larger than an outer diameter of the valve seat part 48 of the piston 18 and can be seated on the valve seat part 48. The disc 162 includes a notch 171 formed on an outer circumferential side thereof, and the notch 171 traverses the valve seat part 48 in the radial direction.

The plurality of discs 163 have the same outer diameter as each other and have the same outer diameter as an outer diameter of the disc 162. The plurality of discs 164 have the same outer diameter as each other and have an outer diameter smaller than the outer diameter of the discs 163. The disc 165 has an outer diameter smaller than the outer diameter of the disc 164. The disc 166 has an outer diameter larger than the outer diameter of the disc 164 and smaller than the outer diameter of the disc 163. The annular member 167 has an outer diameter smaller than the outer diameter of the disc 166 and has larger thickness and higher rigidity than the discs 161 to 166. The annular member 167 is in contact with the shaft step part 29 of the piston rod 21.

The discs 162 to 164 constitute a disc valve 172 which can be separated from and seated on the valve seat part 48. When the disc valve 172 is separated from the valve seat part 48, the disc valve 172 allows the passage portion 40 in the passage hole 39 to communicate with the upper chamber 19 and generate a damping force by inhibiting flow of the oil fluid therebetween. An inside of the notch 171 of the disc 162 is a fixed orifice 173 which allows the upper chamber 19 and the lower chamber 20 to communicate even when the disc 162 is in contact with the valve seat part 48. The disc 166 and the annular member 167 restrict deformation in the opening direction of the disc valve 172 equal to or higher than a specified level.

In the present embodiment, both the extension-side disc valve 131 and the compression-side disc valve 172 have been shown as an example of the disc valve of an inner circumferential clamp, but the present invention is not limited thereto and any mechanism that generates a damping force may be used, and for example, the disc valve may be a lift type valve biased by a coil spring or may be a poppet valve.

As shown in FIG. 3, the mechanism part 127 constituted by the case member 56, the disc 50, the damping valve 121, the plurality of discs 53, the spring disc 54, the disc 55, and the disc 69 constitutes the valve opening control mechanism described above and also constitutes a damping force varying mechanism which makes a damping force variable in response to a frequency of reciprocation of the piston 18 (hereinafter referred to as a piston frequency). In the mechanism part 127, the disc 69 is deformed according to the frequency of reciprocation of the piston 18, and thereby a volume of the back-pressure chamber 101 in constant communication with the upper chamber 19 and the volume of the varying chamber 102 in constant communication with the lower chamber 20 are changed.

As shown in FIG. 2, the annular member 167, the disc 166, the disc 165, the plurality of discs 164, the plurality of discs 163, the disc 162, the disc 161, the piston 18, the disc 50, the disc 51, the pilot valve 52, the plurality of discs 53, the spring disc 54, the disc 55, the case member 56, the plurality of discs 57, the disc 58, the disc 59, and the annular members 60 are stacked in this order on the shaft step part 29 in the piston rod 21 with the attaching shaft part 28 fitted to the insides thereof. At that time, as shown in FIG. 3, the disc 69 is disposed between the bottom part 71 of the case member 56 and the spring disc 54. Also, at this time, in the case member 56, the seal member 96 of the pilot valve 52 is fitted to the outer cylindrical part 73.

As shown in FIG. 2, in a state in which the parts are disposed as described above, a nut 185 is screwed into the male screw 31 of the attaching shaft part 28 which protrudes further than the annular member 60. Thereby, the parts from the annular member 167 to the annular member 60 stacked as described above are clamped in the axial direction with the respective inner circumferential sides or the whole thereof being sandwiched between the shaft step part 29 and the nut 185 of the piston rod 21. At that time, the disc 69 is not clamped in the axial direction but is sandwiched between the spring disc 54 and the case member 56. The nut 185 is a general-purpose hexagonal nut.

As shown in FIG. 1, the base valve 25 described above is provided between the bottom member 12 of the outer cylinder 4 and the inner cylinder 3. The base valve 25 includes a base valve member 191 which partitions the lower chamber 20 and the reservoir chamber 6, a disc 192 provided on a lower side of the base valve member 191, that is, on the reservoir chamber 6 side, a disc 193 provided on an upper side of the base valve member 191, that is, on the lower chamber 20 side, and an attachment pin 194 which attaches the disc 192 and the disc 193 to the base valve member 191.

The base valve member 191 has an annular shape, and the attachment pin 194 is inserted through a center thereof in the radial direction. A plurality of passage holes 195 which cause the oil fluid to flow between the lower chamber 20 and the reservoir chamber 6, and a plurality of passage holes 196 which cause the oil fluid to flow between the lower chamber 20 and the reservoir chamber 6 outside the passage holes 195 in the radial direction are formed in the base valve member 191. The disc 192 on the reservoir chamber 6 side inhibits flow of the oil fluid from the reservoir chamber 6 to the lower chamber 20 through the passage holes 195 while allowing flow of the oil fluid from the lower chamber 20 to the reservoir chamber 6 through the passage holes 195. The disc 193 inhibits flow of the oil fluid from the lower chamber 20 to the reservoir chamber 6 through the passage holes 196 while allowing flow of the oil fluid from the reservoir chamber 6 to the lower chamber 20 through the passage holes 196.

The disc 192, together with the base valve member 191, constitutes a compression-side damping valve mechanism 197 which opens the valve in the compression stroke of the damper 1 to cause the oil fluid to flow from the lower chamber 20 to the reservoir chamber 6 and generate a damping force. The disc 193, together with the base valve member 191, constitutes a suction valve mechanism 198 which opens the valve in the extension stroke of the damper 1 to cause the oil fluid to flow from the reservoir chamber 6 into the lower chamber 20. Further, the suction valve mechanism 198 performs a function of causing a liquid to flow from the reservoir chamber 6 to the lower chamber 20 substantially without generating a damping force in order to supplement a shortage of the liquid caused mainly by extension of the piston rod 21 from the cylinder 2.

Assuming that the mechanism part 127 does not function as the damping force varying mechanism but function as the valve opening control mechanism in the extension stroke in which the piston rod 21 moves to the extension side, when a moving speed of the piston 18 (hereinafter referred to as a piston speed) is low, the oil fluid from the upper chamber 19 flows from the passage portion 38 in the passage hole 37 shown in FIG. 3 to the lower chamber 20 through the passage 130 including the fixed orifice 92 of the damping valve 121 of the damping force generation mechanism 41 and the passage portion 125 between the piston 18 and the outer cylindrical part 73 of the case member 56, and thereby a damping force of orifice characteristics (in which the damping force is approximately proportional to the square of the piston speed) is generated. Therefore, damping force characteristics with respect to the piston speed is such that an increasing rate of the damping force with respect to an increase in the piston speed becomes relatively high.

When the piston speed increases, the oil fluid from the upper chamber 19 flows to the lower chamber 20 through the passage 130 including the passage portion 125 and the gap between the damping valve 121 and the valve seat part 47 of the piston 18 while opening the damping valve 121 of the damping force generation mechanism 41 which is a main valve from the passage portion 38 in the passage hole 37, and thereby a damping force with valve properties (in which the damping force is approximately proportional to the piston speed) is generated. Therefore, damping force characteristics with respect to the piston speed is such that an increasing rate of the damping force with respect to an increase in the piston speed is lowered.

When the piston speed further increases, in addition to the flow to the lower chamber 20 through the passage 130 including the gap between the separated damping valve 121 of the damping force generation mechanism 41 and the valve seat part 47, the oil fluid from the upper chamber 19 flows to the lower chamber 20 through the passage 140 including the gap between the disc valve 131 and the valve seat part 74, the back-pressure chamber inflow passage portion 123, and the back-pressure chamber 101 while opening the disc valve 131 of the damping force generation mechanism 145 which is a hard valve from the back-pressure chamber inflow passage portion 123 and the back-pressure chamber 101, thereby further inhibiting the increase in damping force. Therefore, damping force characteristics with respect to the piston speed is such that an increasing rate of the damping force with respect to an increase in the piston speed is further lowered.

When the piston speed further increases, a relationship of a force (an oil pressure) acting on the pilot valve 52 in the mechanism part 127 is such that a force in an opening direction applied from the passage portion 38 is larger than a force in a closing direction applied from the back-pressure chamber 101. Therefore, in this region, as the piston speed increases, the damping valve 121 of the damping force generation mechanism 41 opens further away from the valve seat part 47 of the piston 18 than that described above while deforming the disc 51 and the pilot valve 52, and this causes more of the oil fluid to flow to the lower chamber 20 through the passage 130 including the passage portion 125 in addition to the flow to the lower chamber 20 through the passage 140 including the passage portion 38 in the passage hole 37, back-pressure chamber inflow passage portion 123, back-pressure chamber 101, and the gap between the disc valve 131 and the valve seat part 74 of the damping force generation mechanism 145, and thereby an increase in damping force is further inhibited. Therefore, damping force characteristics with respect to the piston speed is such that the increasing rate of the damping force with respect to an increase in the piston speed is further lowered.

In the compression stroke in which the piston rod 21 moves to the compression side, when the piston speed is low, the oil fluid from the lower chamber 20 flows to the upper chamber 19 through the passage portion 40 in the passage hole 39 on the compression side shown in FIG. 2 and the fixed orifice 173 of the disc valve 172 of the damping force generation mechanism 42, and thereby a damping force of orifice characteristics (in which the damping force is approximately proportional to the square of the piston speed) is generated. Therefore, damping force characteristics with respect to the piston speed is such that an increasing rate of the damping force with respect to an increase in the piston speed becomes relatively high. Also, when the piston speed increases, the oil fluid introduced from the lower chamber 20 into the passage portion 40 in the compression-side passage hole 39 basically flows to the upper chamber 19 through a gap between the disc valve 172 and the valve seat part 48 while opening the disc valve 172 of the damping force generation mechanism 42, and thereby a damping force with valve properties (in which the damping force is approximately proportional to the piston speed) is generated. Therefore, damping force characteristics with respect to the piston speed is such that an increasing rate of the damping force with respect to an increase in the piston speed is lowered.

Although the description above is a case on the assumption that the mechanism part 127 does not function as the damping force varying mechanism but functions as the valve opening control mechanism, in the first embodiment, the mechanism part 127 functions as a damping force varying mechanism in which a damping force is variable according to a piston frequency even when the piston speed is constant.

That is, when a piston frequency is high, an amplitude of the piston 18 is small, and in the extension stroke at the time of such a high piston frequency, when a pressure in the upper chamber 19 increases and the oil fluid is introduced from the upper chamber 19 to the back-pressure chamber 101 through the passage portion 38 in the passage hole 37 shown in FIG. 3 and the back-pressure chamber inflow passage portion 123, in accordance with this, the disc 69 which has been in a flat plate shape and in contact with the seat surface 61 is elastically deformed to enter the recess 64 while maintaining the state in which the communication between the back-pressure chamber 101 and the varying chamber 102 is blocked, and thereby a volume of the back-pressure chamber 101 expands and the oil fluid from the varying chamber 102 is discharged to the lower chamber 20 through the passage portion 103 in the through hole 67.

In this manner, the oil fluid is introduced into the back-pressure chamber 101 from the upper chamber 19 while deforming the disc 69, and as a result, the flow rate of the oil fluid flowing from the upper chamber 19 to the lower chamber 20 through the passage portion 38 in the passage hole 37 while opening the damping force generation mechanism 41 is reduced. In addition, as the volume of the back-pressure chamber 101 is expanded, an increase in pressure of the back-pressure chamber 101 is suppressed, and thereby the damping valve 121 of the damping force generation mechanism 41 is easily opened. Thereby, the extension-side damping force becomes soft. At this time, the damping force generation mechanism 145 which is a hard valve is not opened.

Here, when the piston frequency is high, since an amount of the oil fluid introduced from the upper chamber 19 to the back-pressure chamber 101 is small, deformation of the disc 69 is small and a state in which the disc 69 is in contact with the stopper surface 63 and the deformation is restricted thereby does not occur. Therefore, the damping force becomes soft each time the extension stroke is performed.

Although the pressure of the back-pressure chamber 101 increases in accordance with the rigidity (a spring reaction force) of the disc 69, since the piston frequency is a high frequency and bending of the disc 69 is small, the increase in pressure of the back-pressure chamber 101 can be inhibited and an influence on the ease of opening the damping valve 121 can be inhibited.

On the other hand, when a piston frequency is low, an amplitude of the piston 18 is large, and in the extension stroke at the time of such a low piston frequency, although the oil fluid flows from the upper chamber 19 to the back-pressure chamber 101 in the same manner as described above at the beginning of the extension stroke, thereafter, since an amount of the oil fluid flowing into the back-pressure chamber 101 is large and deformation of the disc 69 is large, the disc 69 comes into contact with the stopper surface 63 and deformation more than that is restricted, and thereby the oil fluid does not flow from the upper chamber 19 to the back-pressure chamber 101. Since the oil fluid does not flow from the upper chamber 19 to the back-pressure chamber 101, the pressure of the back-pressure chamber 101 increases and opening of the damping valve 121 of the damping force generation mechanism 41 is inhibited. That is, the damping valve 121 in the damping force generation mechanism 41 does not open, and the oil fluid is in a state of flowing from the upper chamber 19 to the lower chamber 20 through the fixed orifice 92, and the damping force on the extension side becomes hard. When the pressure in the back-pressure chamber 101 further increases, the oil fluid opens the disc valve 131 of the damping force generation mechanism 145 which is a hard valve and flows to the lower chamber 20 through the passage 140 including the gap between the disc valve 131 and the valve seat part 74, the back-pressure chamber inflow passage portion 123, and the back-pressure chamber 101. When the pressure in the back-pressure chamber 101 further increases, the oil fluid opens the damping valve 121 of the damping force generation mechanism 41 and flows through the passage 130 to the lower chamber 20 in addition to the flow through the passage 140. Thereby, the damping force on the extension side becomes hard.

Here, in the mechanism part 127, at the time of the compression stroke, a pressure in the lower chamber 20 increases and thereby a pressure in the varying chamber 102 is higher than a pressure in the back-pressure chamber 101. As a result, the disc 69 of the check valve 105 is separated from the seat surface 61 against the biasing force of the spring disc 54. Thereby, the check valve 105 opens the passage 140 including the passage portion 103 in the through hole 67 and causes the oil fluid to flow from the lower chamber 20 toward the upper chamber 19. At that time, the disc 69 is separated from the seat surface 61 to eliminate the differential pressure, and further movement is suppressed. The biasing force of the spring disc 54 is sufficient as long as it has a force to bring the disc 69 into contact with the seat surface 61 in absence of a load pressure, and when it functions as the check valve 105, a preload being excessively applied is not preferable in view of the function.

Figure 4:
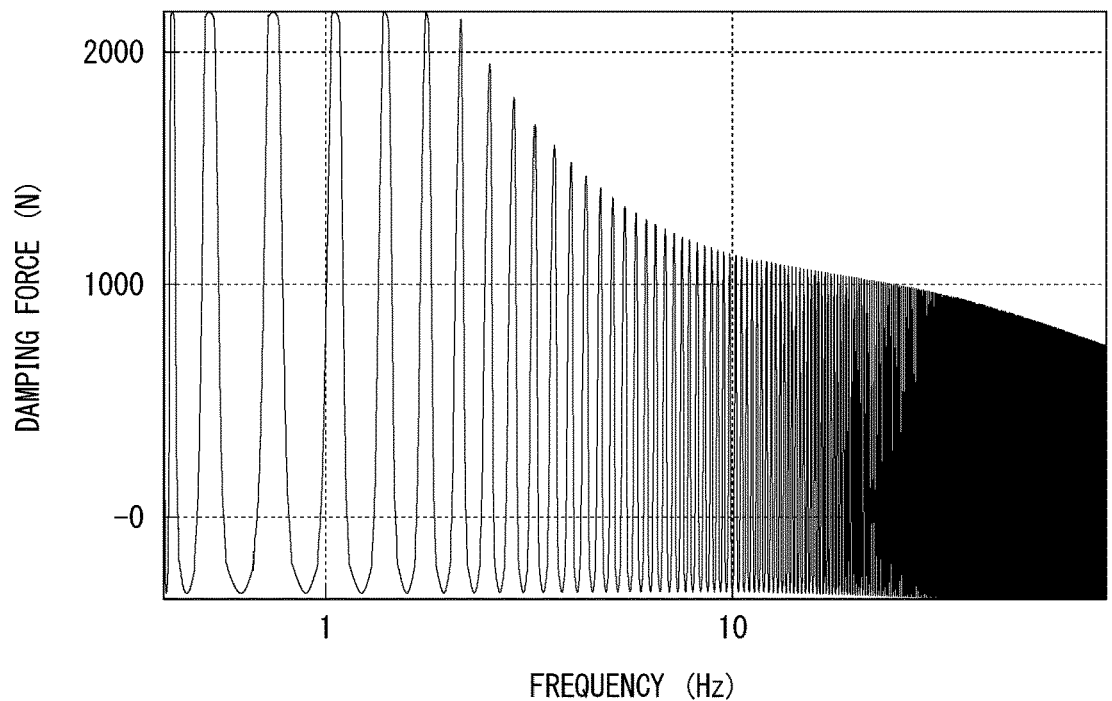
FIG. 4 is a characteristic diagram showing damping force characteristics with respect to a frequency when sweep excitation is applied at a constant maximum piston speed of the damper of the first embodiment of the present invention.
Figure 5:
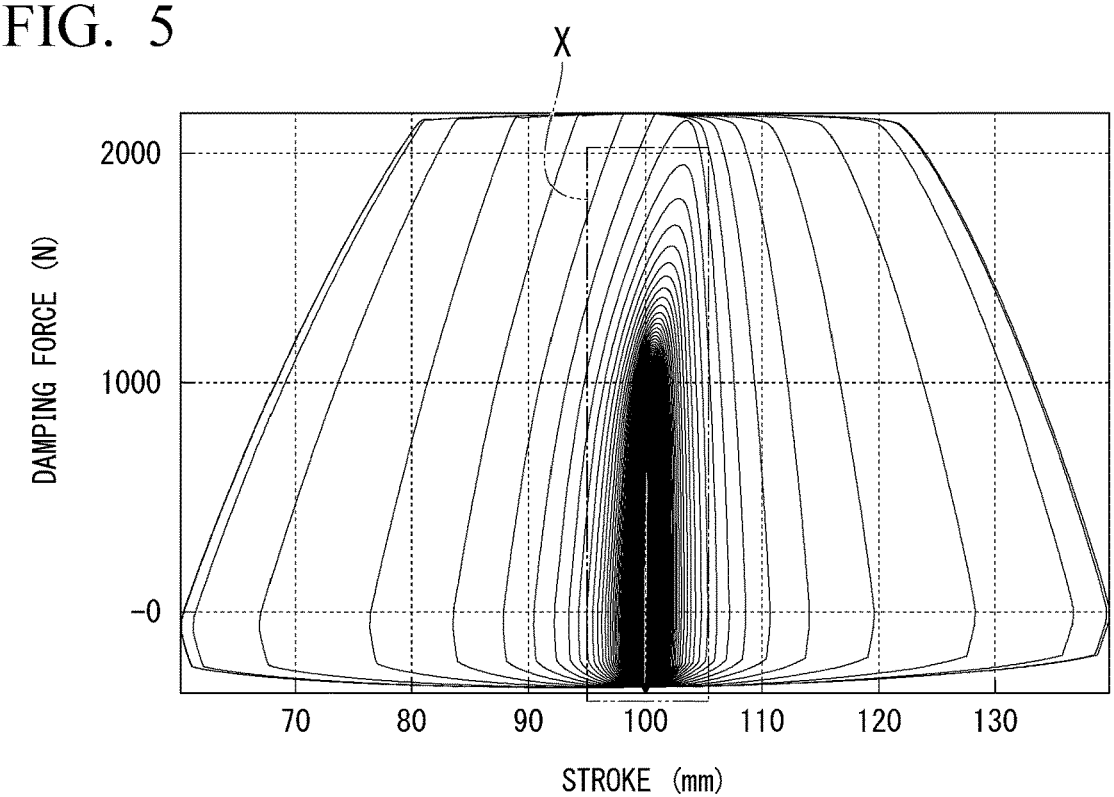
FIG. 5 is a Lissajous waveform diagram showing damping force characteristics with respect to a piston stroke of the damper of the first embodiment of the present invention.
Figure 6:
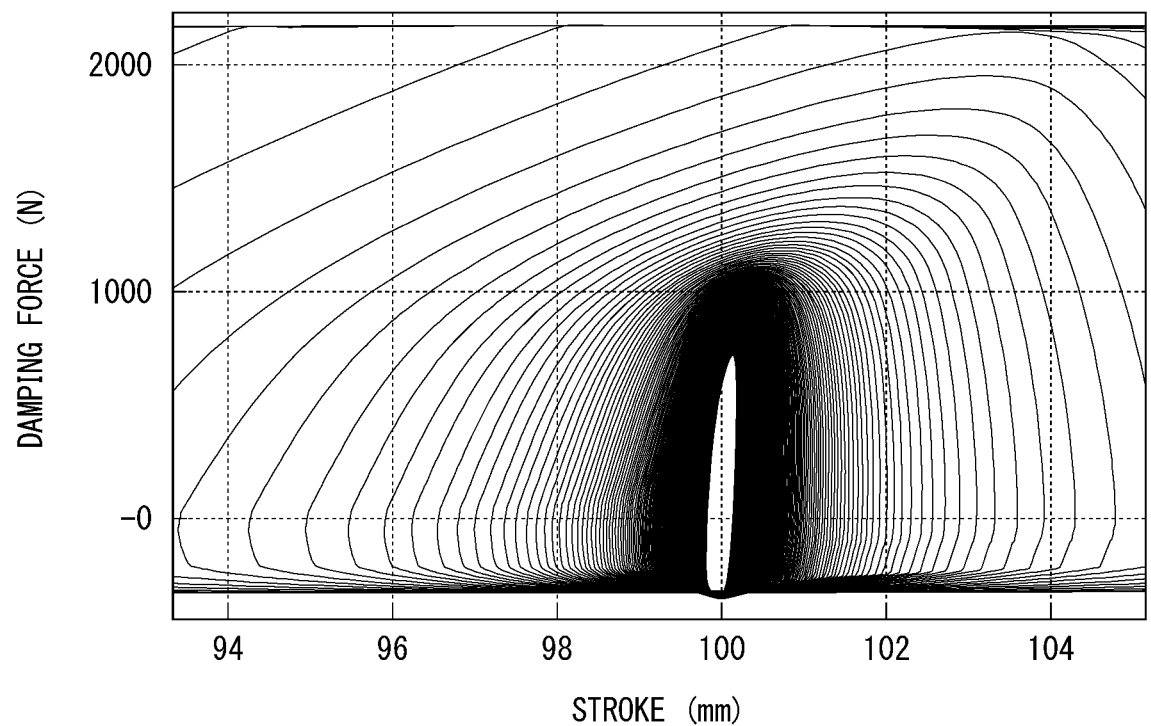
FIG. 6 is an enlarged view of the range X of FIG. 5.

A simulation was performed on damping force characteristics of the damper 1 of the first embodiment of the configuration described above. FIG. 4 shows damping force characteristics with respect to a frequency obtained by a simulation when sweep excitation is applied at a constant maximum piston speed. From FIG. 4, it is ascertained that a damping force can be sufficiently varied between when the piston frequency is low frequency and when the piston frequency is high frequency. Further, FIG. 5 shows a Lissajous waveform showing a relationship between a piston stroke and a damping force obtained by the simulation, and FIG. 6 is an enlarged view of the range X of FIG. 5. It is ascertained from FIGS. 5 and 6 that the Lissajous waveform becomes smooth and the ride comfort is improved.

In Patent Document 1 described above, the damping force varying mechanism is large in size and there is room for improvement in miniaturization.

On the other hand, in the damper 1 of the first embodiment, since the mechanism part 127 as the damping force varying mechanism has a structure in which the annular disc 69 is provided in the bottomed cylindrical case member 56 to face the bottom part 71 of the case member 56 to partition the back-pressure chamber 101 and the varying chamber 102 and the through hole 67 is provided in the bottom part 71 of the case member 56 to face the disc 69, miniaturization, reduction in weight, simplification, reduction in the number of parts, and cost reduction can be achieved.

Also, since the mechanism part 127 is a structure attached to the piston rod 21, a basic length of the damper 1 can be made small by miniaturizing the mechanism part 127.

Also, since the mechanical part 127 is concurrently used for the damping force varying mechanism and the valve opening control mechanism, compared to a case in which these are separately provided, miniaturization, reduction in weight, simplification, reduction in the number of parts, cost reduction, and reduction in basic length can be achieved.

Also, since the disc 69 is a floating type biased by the spring disc 54, the disc 69 functions as the check valve 105 satisfactorily.

Also, since the damping force generation mechanism 145 different from the damping force generation mechanism 41 is disposed outside the case member 56 to face the bottom part 71 thereof and the through hole 68 is provided in the bottom part 71 of the case member 56 to face the damping force generation mechanism 145, the damping force generation mechanism 145 can also be compactly disposed.

Also, since the through hole 67 is provided on a side outward from the through hole 68 in the bottom part 71 of the case member 56, the damping force generation mechanism 145 facing the through hole 68 can be miniaturized in the radial direction. Although miniaturization can be achieved with such a disposition, on the other hand, when the valve seat part 74 and the disc valve 131 are made small in diameter, the rigidity increases and the pressure for valve opening increases. Therefore, for example, when the through hole 67 is obliquely formed, that is, an end of the through hole 67 on the lower chamber 20 side is obliquely formed to be on the inner cylinder 3 side, the diameter of the valve seat part 74 can be increased and the diameter of the disc valve 131 can also be increased to decrease the rigidity. Also, when outer diameters of the disc contact part 62 and the disc 69 are disposed such that a large diameter portion and a small diameter portion alternate, that is, disposed in a petal shape, and the disc contact part 62 is also shaped to conform to the shape, the through hole 67 can be disposed on the outer diameter side, and thus the rigidity can be lowered by increasing the diameter of the valve seat part 74 and increasing the diameter of the disc valve 131.

Also, since the damping force generation mechanism 41 is configured such that valve opening thereof is adjusted by the pressure of the back-pressure chamber 101, the valve opening of the damping force generation mechanism 41 can be adjusted by a pressure.

Also, since the plurality of passage portions 82 and 116 are provided in series as an introduction orifice between the passage 130 and the back-pressure chamber 101, even if passage areas of the respective passage portions 82 and 116 are made relatively large, the flow rate can be sufficiently reduced. Thus, formation of the passage portions 82 and 116 is facilitated.

Second Embodiment

Next, a second embodiment will be described mainly on the basis of FIGS. 7 and 8, focusing on differences from the first embodiment. Parts common to those in the first embodiment are denoted by the same terms and the same reference signs.

Figure 7:
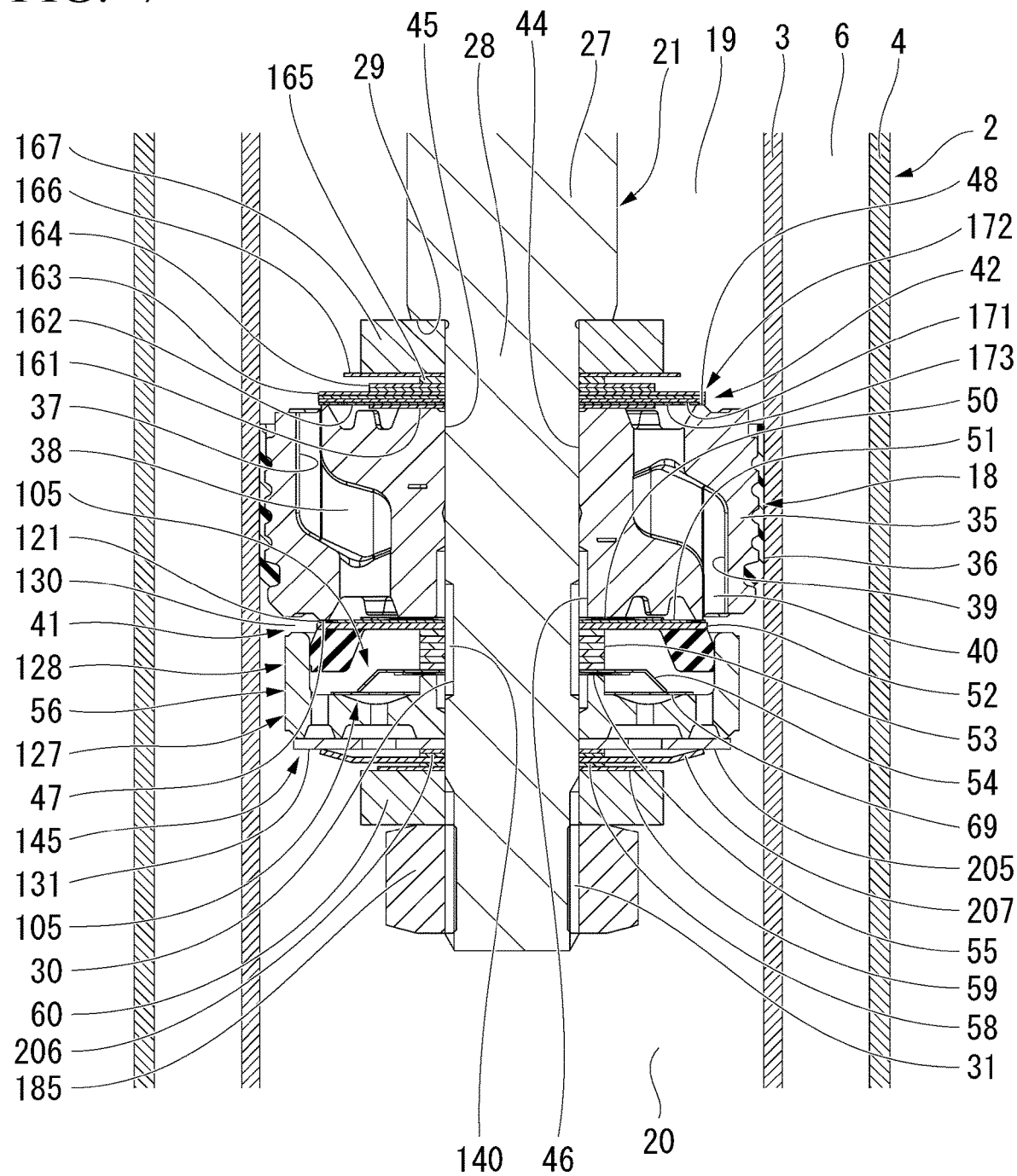
FIG. 7 is a partial cross-sectional view showing surroundings of a piston of a damper of a second embodiment of the present invention.

In the second embodiment, as shown in FIG. 7, a case member 56, a disc 69, and a disc valve 131 are partially different from those in the first embodiment.

Figure 8:
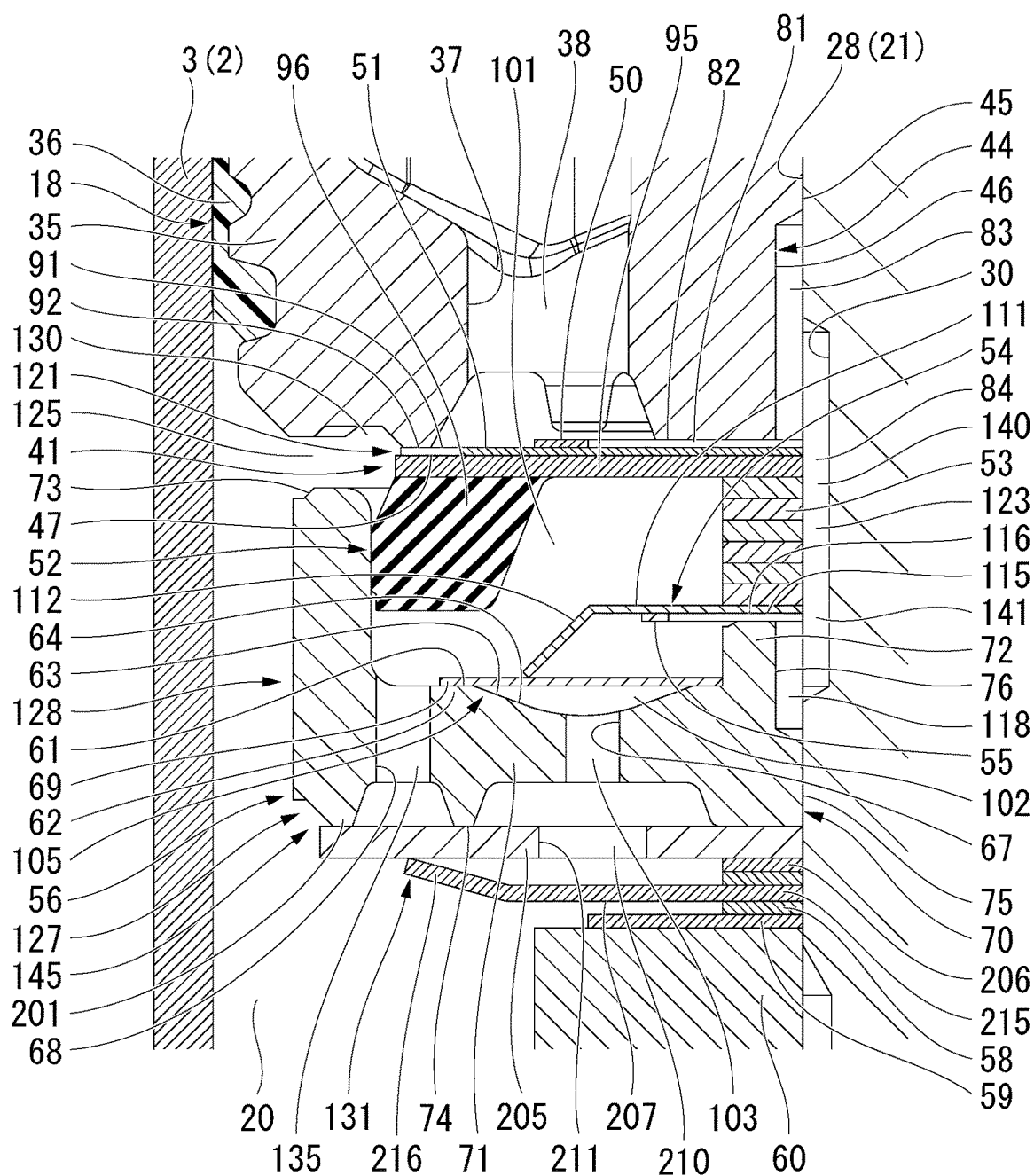
FIG. 8 is a partial cross-sectional view showing surroundings of a valve mechanism of the damper of the second embodiment of the present invention.

As shown in FIG. 8, the case member 56 of the second embodiment includes a disc contact part 62 having a seat surface 61, a recess 64 having a stopper surface 63, and a through hole 67 penetrating a bottom part 71 in an axial direction, which are similar to those in the first embodiment, which are formed not on an outer cylindrical part 73 side but on an inner cylindrical part 72 side in a radial direction of the bottom part 71. The through hole 67 is disposed between a valve seat part 74 and the inner cylindrical part 72 in the radial direction of the bottom part 71.

Also, an annular valve seat part 201 protruding from the bottom part 71 to the same side as the valve seat part 74 in the axial direction of the bottom part 71 is provided on an outer side in the radial direction of the valve seat part 74 of the bottom part 71. A through hole 68 is disposed between the valve seat part 74 and the valve seat part 201 in the radial direction of the bottom part 71. Thus, the through hole 67 is provided on an inner side of the through hole 68 in the radial direction of the case member 56, that is, in the radial direction of the bottom part 71.

The disc 69 of the second embodiment has smaller inner and outer diameters compared to those in the first embodiment according to the disposition of the disc contact part 62, the recess 64 and the through hole 67 on the inner cylindrical part 72 side in the radial direction of the bottom part 71. Also in the disc 69 of the second embodiment, both the inner circumferential side and outer circumferential side are in surface contact with the seat surface 61 of the disc contact part 62 over the entire circumference.

In a damping force generation mechanism 145 of the second embodiment, the disc valve 131 thereof includes, a disc 205 having an outer diameter slightly larger than an outer diameter of the valve seat part 201, a plurality of discs 206 having an outer diameter smaller than that of the disc 205, and a spring disc 207 in order from the case member 56 side in the axial direction, and these are sandwiched between the case member 56 and a disc 58.

The disc 205 can be separated from and seated on the valve seat part 201, and when the disc 205 is separated from the valve seat part 201 by a pressure of a back-pressure chamber 101 received via a passage portion 135 in the through hole 68, the back-pressure chamber 101 and a lower chamber 20 are allowed to communicate with each other via the passage portion 135 in the through hole 68, and flow of an oil fluid between them is inhibited to generate a damping force. A through hole 211 which forms a passage portion 210 allowing constant communication between a varying chamber 102 and the lower chamber 20 via a passage portion 103 in the through hole 67 is formed in the disc 205 in the axial direction.

The spring disc 207 includes a flat plate-like base plate 215 having an outer diameter larger than an outer diameter of the disc 206 and a pressing plate 216 extending obliquely from the base plate 215. The base plate 215 is annular, and the pressing plate 216 extends from an outer circumferential edge portion of the base plate 215 to be inclined toward one side in the axial direction and outward in the radial direction. The pressing plate 216 is inclined to approach the disc 205 toward a distal end side of the extension, and a plurality of (only one is shown in FIG. 8 because it is a cross section) pressing plates 216 are formed at intervals in the circumferential direction of the base plate 215. The spring disc 207 presses the disc 205 against the valve seat parts 74 and 201 by the plurality of pressing plates 216 being in contact with an outer diameter side of the disc 205 opposite to the case member 56.

According to the second embodiment with such a configuration, since the through hole 67 is provided on an inner side of the through hole 68 of the bottom part 71, in other words, the through hole 68 is provided on an outer side of the through hole 67 of the bottom part 71, a diameter of the disc valve 131 of the damping force generation mechanism 145 facing the through hole 68 can be increased, and a valve opening pressure of the disc valve 131 can be easily adjusted.

Third Embodiment

Next, a third embodiment will be described mainly on the basis of FIGS. 9 and 10, focusing on differences from the second embodiment. Parts common to those in the first embodiment are denoted by the same terms and the same reference signs.

Figure 9:
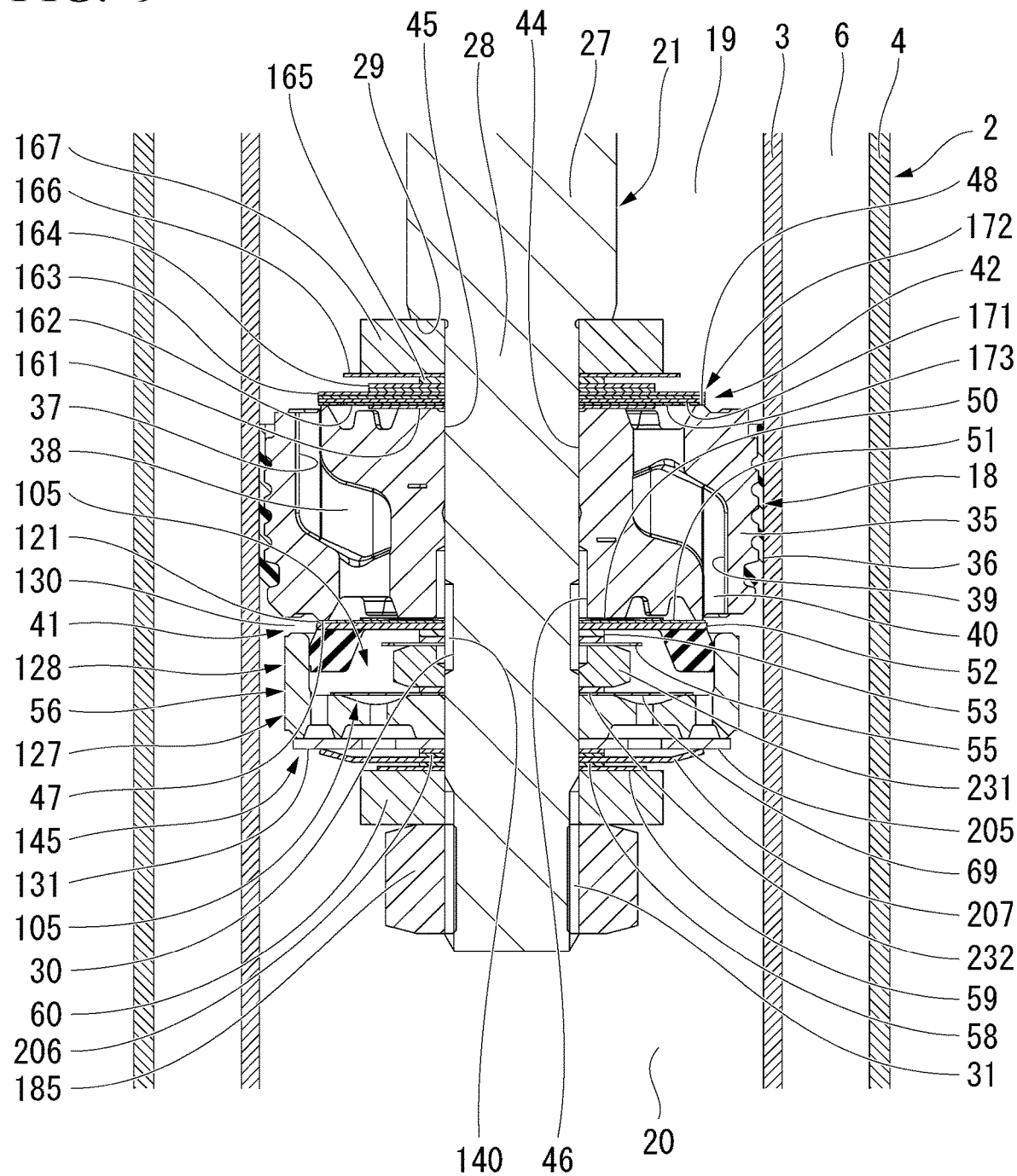
FIG. 9 is a partial cross-sectional view showing surroundings of a piston of a damper of a third embodiment of the present invention.

In the third embodiment, as shown in FIG. 9, the spring disc 54 is not provided, and a case member 56 and a disc 69 are partially different from those in the second embodiment.

Figure 10:
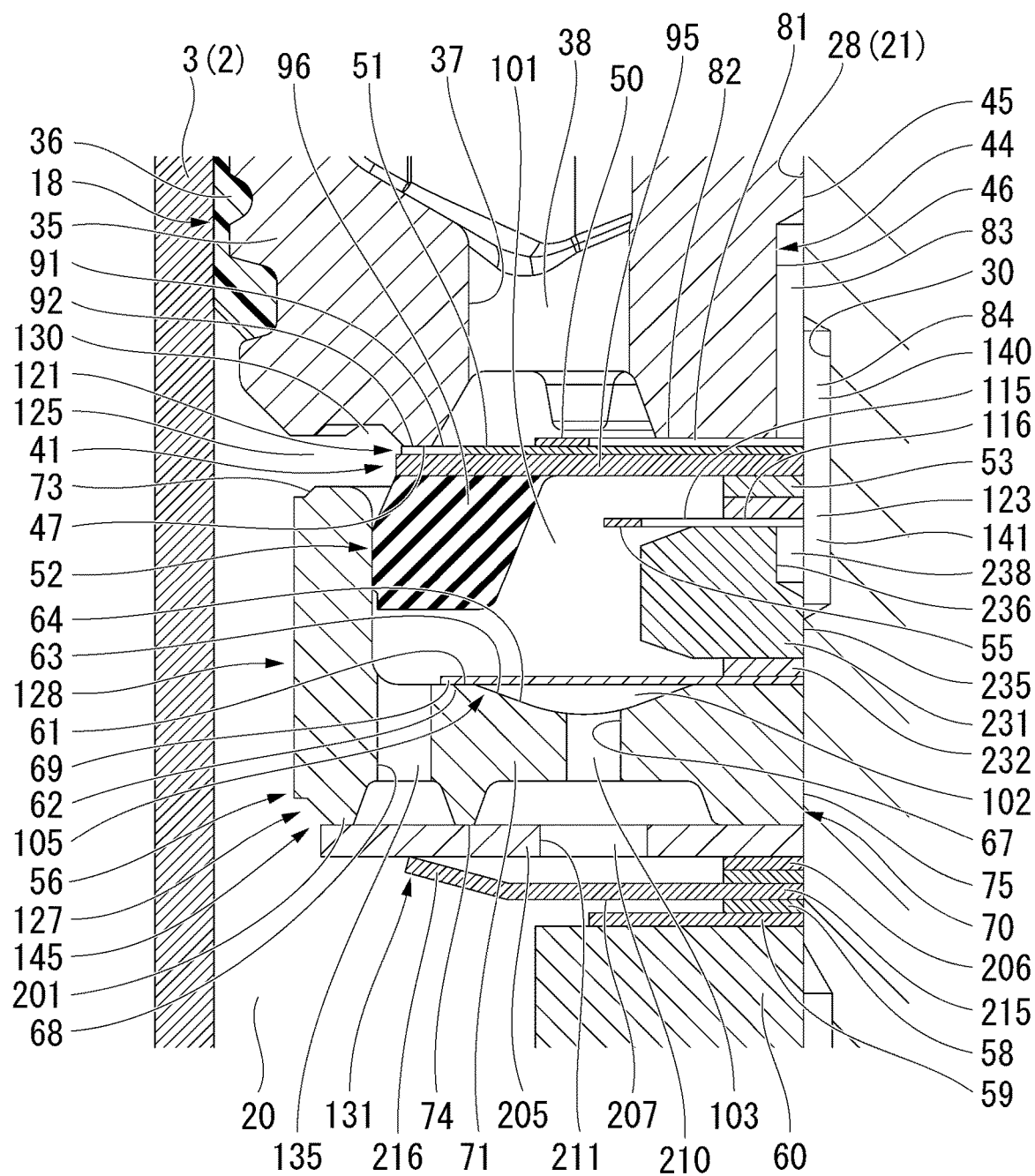
FIG. 10 is a partial cross-sectional view showing surroundings of a valve mechanism of the damper of the third embodiment of the present invention.

As shown in FIG. 10, the case member 56 of the third embodiment does not have a portion of an inner cylindrical part 72 protruding to the same side as an outer cylindrical part 73, and a seat surface 61 extends to a through hole 70. Also, a large diameter hole portion 76 also is not formed on an inner circumferential side of the inner cylindrical part 72. Thus, an attaching shaft part 28 of a piston rod 21 is fitted to an inner circumferential side of the disc 69. Also, the number of discs 53 is smaller than that of the second embodiment, and a disc 55 having a notch 115 forming a passage portion 116 is in contact with the discs 53. An annular member 231 and a disc 232 are disposed between the disc 55 and the disc 69, and the inner circumferential side of the disc 69 is sandwiched between the disc 232 and the bottom part 71 of the case member 56. That is, the disc 69 of the third embodiment is of a clamp type in which the inner circumferential side is clamped not to move in the axial direction with respect to the piston rod 21.

On an inner circumference of the annular member 231, a small diameter hole portion 235 to which the attaching shaft part 28 of the piston rod 21 is fitted is formed on the disc 232 side in the axial direction, and a large diameter hole portion 236 having a diameter larger than that of the small diameter hole portion 235 is formed on the disc 55 side in the axial direction.

In the third embodiment, a passage portion 82 in a notch 81 of the disc 50, a passage portion 83 between a large diameter hole portion 46 of the piston 18 and the attaching shaft part 28, a passage portion 84 in a passage groove 30 of the piston rod 21, a passage portion 238 between the large diameter hole portion 236 of the annular member 231 and the attaching shaft part 28, and the passage portion 116 in the notch 115 of the disc 55 form a back-pressure chamber inflow passage portion 123 which allows constant communication between a passage portion 38 of the piston 18 and the back-pressure chamber 101 so that the oil fluid is introduced from the passage portion 38 into the back-pressure chamber 101.

According to the third embodiment with such a configuration, since the disc 69 is of a clamp type which is partially clamped, the valve rigidity is increased, varying characteristics of the damping force with respect to a frequency becomes gentle, and the damping force on a soft side increases slightly. Also, when the valve rigidity of the disc 69 is increased, non-linearity of the disc 69 at the time of being in contact with a stopper surface 63 is reduced accordingly, and a Lissajous waveform becomes smoother.

Fourth Embodiment

Next, a fourth embodiment will be described mainly on the basis of FIGS. 11 and 12, focusing on differences from the second embodiment. Parts common to those in the second embodiment are denoted by the same terms and the same reference signs.

Figure 11:
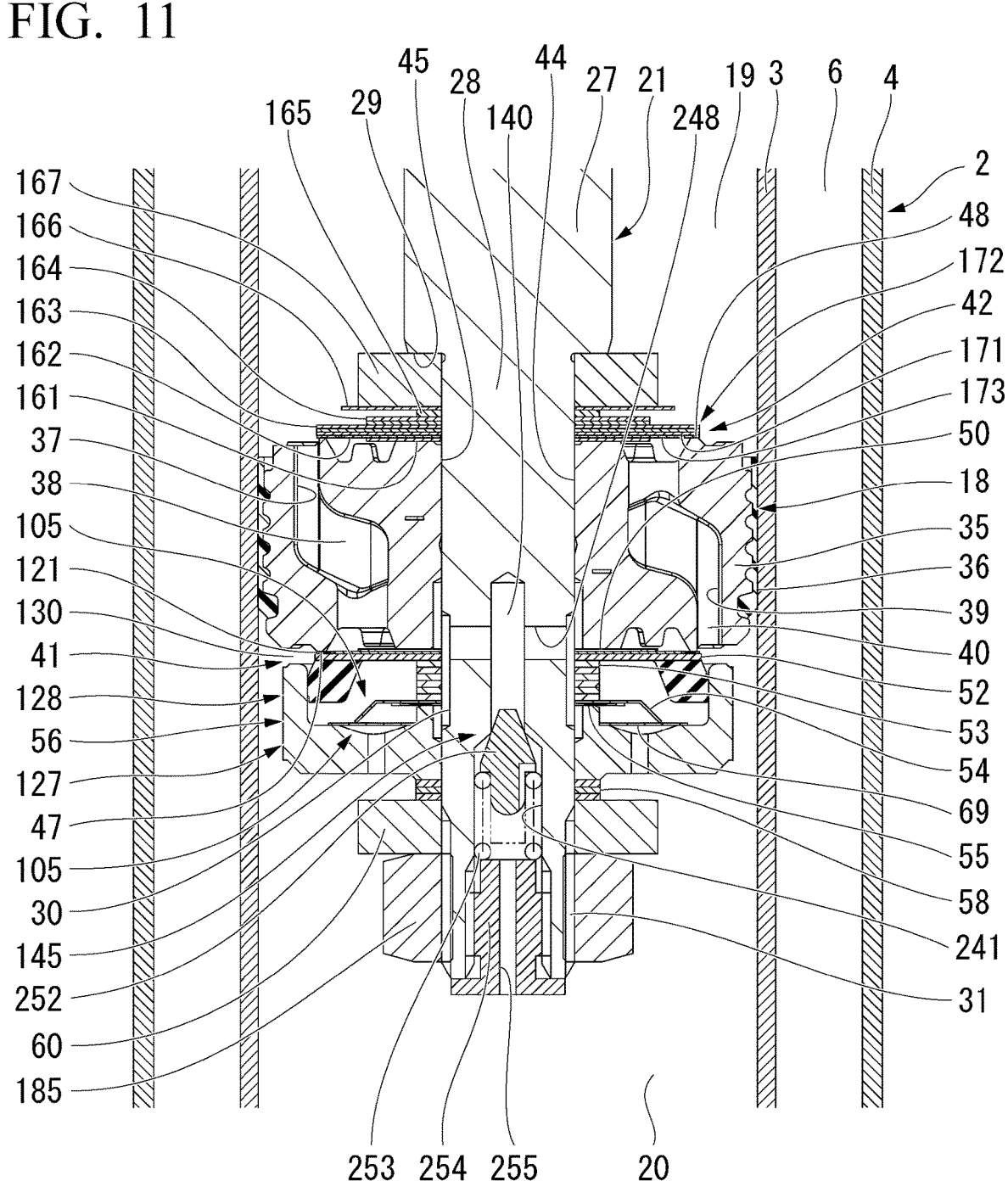
FIG. 11 is a partial cross-sectional view showing surroundings of a piston of a damper of a fourth embodiment of the present invention.
Figure 12:
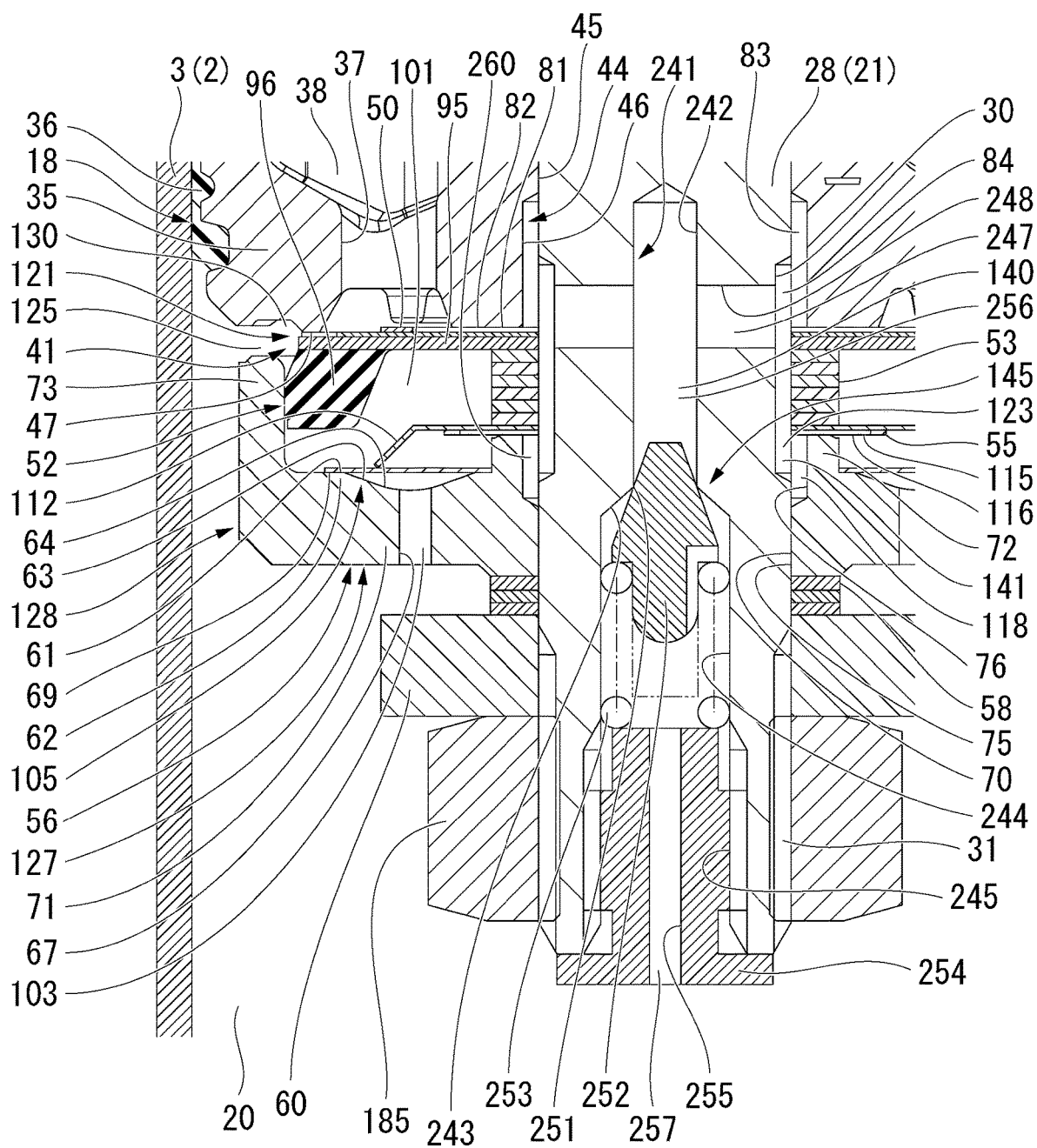
FIG. 12 is a partial cross-sectional view showing surroundings of a valve mechanism of the damper of the fourth embodiment of the present invention.

In the fourth embodiment, as shown in FIG. 11, a damping force generation mechanism 145 is not provided on an outer side of a case member 56 but is provided in a piston rod 21.

In an attaching shaft part 28 of the piston rod 21 of the fourth embodiment, a hole portion 241 which opens to a side opposite to a main shaft part 27 in the axial direction is formed. As shown in FIG. 12, the hole portion 241 includes a small diameter hole portion 242, a tapered hole portion 243, an intermediate hole portion 244, and a screw hole portion 245 in order from a bottom side. The intermediate hole portion 244 has a diameter larger than that of the small diameter hole portion 242, and the tapered hole portion 243 has a tapered shape that increases in diameter toward the intermediate hole portion 244 side to connect them. Also, a radial hole 248 which forms a passage portion 247 for opening a passage portion 84 in a passage groove 30 to the small diameter hole portion 242 is formed in the attaching shaft part 28.

A valve body 252 which is in contact with a valve seat part 251 at a boundary between the small diameter hole portion 242 and the tapered hole portion 243 over the entire circumference, and a spring 253 which biases the valve body 252 in a direction in which the valve body 252 is brought into contact with the valve seat part 251 are provided in the hole portion 241, and a lid member 254 which sandwiches the spring 253 between the lid member 254 and the valve body 252 is screwed into the screw hole portion 245. A through hole 255 penetrating in the axial direction is formed in the lid member 254. The valve body 252 is configured to be separable from the valve seat part 251 while compressing the spring 253.

A passage portion 38 in a passage hole 37 of a piston 18, a passage portion 82 in a notch 81 of a disc 50, a passage portion 83 between a large diameter hole portion 46 of the piston 18 and the attaching shaft part 28, the passage portion 84 in the passage groove 30 of the piston rod 21, the passage portion 247 in the radial hole 248, a passage portion 256 in the hole portion 241, and a passage portion 257 in the through hole 255 form a passage 140 which is partially in parallel to a passage 130 and allows an upper chamber 19 and a lower chamber 20 to communicate with each other.

Also, a passage portion 116 in a notch 115 of a disc 55, a passage portion 118 between a large diameter hole portion 76 of the case member 56 and the attaching shaft part 28, and the passage portion 84 in the passage groove 30 of the piston rod 21 form a passage 260 which allows a back-pressure chamber 101 to communicate with the passage 140.

In the fourth embodiment, the valve seat part 251, the valve body 252, and the spring 253 form the damping force generation mechanism 145 that opens the valve to generate a damping force when a pressure in the back-pressure chamber 101 reaches a predetermined pressure. When the damping force generation mechanism 145 opens the valve, the oil fluid from the upper chamber 19 flows from the upper chamber 19 to the lower chamber 20 via the passage portion 38 of the piston 18, the passage portion 82 of the disc 50, the passage portion 83 in the large diameter hole portion 46 of the piston 18, the passage portion 84, the passage portion 247, and the passage portion 256 of the piston rod 21, and the passage portion 257 of the lid member 254, but does not pass through the passage portion 116 of the disc 55 which is an introduction orifice on the back-pressure chamber 101 side.

In the fourth embodiment, since the damping force generation mechanism 145 is provided in the piston rod 21, neither valve seat parts 74 and 201 and a through hole 68 of the case member 56 nor a disc valve 131 and a disc 59 are provided. Instead of the disc valve 131 and the disc 59, a plurality of discs 58 are provided.

According to the fourth embodiment with such a configuration, since the damping force generation mechanism 145 is provided in the piston rod 21, the structure around the piston rod 21 can be simplified.

Although an example in which the present invention is used for a dual-tube type hydraulic damper has been described in the embodiment described above, the present invention is not limited thereto and may be used for a mono-tube type hydraulic damper in which the outer cylinder is eliminated and a gas chamber is formed on a side of the lower chamber 20 opposite to the upper chamber 19 in the cylinder 2 using a slidable partition, or can be used for any damper including a pressure control valve that uses a packing valve having a structure in which a seal member is provided in a disc. As a matter of course, the present invention can be applied to the compression-side damping force generation mechanism 42 described above, or the present invention can be applied to the base valve 25 described above. Also, the present invention is also applicable to a case in which an oil passage communicating with an inside of the cylinder 2 is provided outside the cylinder 2 and a damping force generation mechanism is provided in the oil passage. Further, although a hydraulic damper has been described as an example in the embodiment described above, water and air can also be used as the fluid.

According to a first aspect of the embodiment described above, the damper includes a cylinder in which a working fluid is sealed, a piston slidably fitted into the cylinder and configured to partition an inside of the cylinder into a first cylinder chamber and a second cylinder chamber, a piston rod in which one end side is connected to the piston and an other end side extends to the outside of the cylinder, a first passage in which the working fluid flows out from one of the cylinder chambers due to movement of the piston, a second passage provided in parallel to the first passage, a first damping force generation mechanism provided in the first passage to generate a damping force, an annular case member having a bottomed cylindrical shape which penetrates a shaft-shaped member and has at least a portion of the second passage formed inside, an annular disc which penetrates the shaft-shaped member and is disposed to face a bottom part of the case member in the case member to be able to be bent by the working fluid in the case member, a first chamber communicating with the first cylinder chamber and a second chamber communicating with the second cylinder chamber which are provided by the disc partitioning the inside of the case member, a first through hole provided in the bottom part of the case member and configured to communicate with the second chamber, a bypass passage provided in parallel to the first through hole and configured to allow communication between the first chamber and the second cylinder chamber, and a second damping force generation mechanism provided in the bypass passage and configured to open a valve thereof when a pressure inside the first chamber reaches a predetermined pressure to generate a damping force. Thereby, miniaturization and reduction in weight can be achieved.

According to a second aspect, in the first aspect, the disc is of a floating type which is biased by a spring means. Thereby, the disc functions satisfactorily as a check valve.

According to a third aspect, in the first aspect, the disc is of a clamp type which is partially clamped. Thereby, a valve rigidity of the disc is increased and damping force variability with respect to a frequency becomes gentle.

According to a fourth aspect, in any one of the first to third aspects, the second damping force generation mechanism is disposed outside the case member to face the bottom part, and a second through hole is provided in the bottom part to face the second damping force generation mechanism. Thereby, the second damping force generation mechanism can be compactly disposed.

According to a fifth aspect, in the fourth aspect, the first through hole is provided on an outer side of the second through hole in the bottom part. The second damping force generation mechanism facing the first through hole can be made compact in a radial direction.

According to a sixth aspect, in the fourth aspect, the first through hole is provided on an inner side of the second through hole in the bottom part. Thereby, a diameter of the second damping force generation mechanism facing the second through hole can be increased, and a valve opening pressure can be easily adjusted.

According to a seventh aspect, in any one of the first to sixth aspects, valve opening of the first damping force generation mechanism is adjusted by a pressure of a case chamber, and an introduction orifice is provided between the first passage and the case chamber. Thereby, the valve opening of the first damping force generation mechanism can be adjusted by the pressure of the case chamber.

According to an eighth aspect, in the seventh aspect, a plurality of the introduction orifices are provided in series. Thereby, an oil fluid can be sufficiently reduced even if a passage area of each of the introduction orifices is made relatively large, and thus the formation thereof is facilitated.

INDUSTRIAL APPLICABILITY

According to the aspects described above, miniaturization of the damper can be achieved.

REFERENCE SIGNS LIST

1 Damper
2 Cylinder
18 Piston
19 Upper chamber (first cylinder chamber)
20 Lower chamber (second cylinder chamber)
21 Piston rod (shaft-shaped member)
28 Shaft part (attaching shaft part)
41 Damping force generation mechanism (first damping force generation mechanism)
54 Spring disc (spring means)
56 Case member
67 Through hole (first through hole)
68 Through hole (second through hole)
69 Disc
71 Bottom part
82, 116 passage portion (introduction orifice)
101 Back-pressure chamber (first chamber)
102 Varying chamber (second chamber)
130 Passage (first passage)
135 Passage portion (bypass passage)
140 Passage (second passage)
145 Damping force generation mechanism (second damping force generation mechanism)

What is claimed is:
1. A damper, comprising:
a cylinder in which a working fluid is sealed;
a piston slidably fitted into the cylinder and configured to partition an inside of the cylinder into a first cylinder chamber and a second cylinder chamber;
a piston rod in which one end side is connected to the piston and an other end side extends to an outside of the cylinder;
a first passage in which the working fluid flows out from one of the cylinder chambers due to movement of the piston;
a second passage provided in parallel to the first passage;
a first damping force generation mechanism provided in the first passage to generate a damping force;
an annular case member having a bottomed cylindrical shape which penetrates a shaft-shaped member and has at least a portion of the second passage formed inside, wherein a recess is formed on a bottom part of the annular case member;
an annular disc which is disposed above the recess and penetrates the shaft-shaped member and is disposed to face the bottom part of the annular case member to be able to be bent so as to enter the recess by the working fluid in the annular case member;
a first chamber communicating with the first cylinder chamber and a second chamber communicating with the second cylinder chamber which are provided by the annular disc partitioning the inside of the annular case member;
a first through hole provided in the recess formed on the bottom part of the annular case member and configured to communicate with the second chamber;
a bypass passage provided in parallel to the first through hole and configured to allow communication between the first chamber and the second cylinder chamber; and
a second damping force generation mechanism provided in the bypass passage and configured to open a valve thereof when a pressure inside the first chamber reaches a predetermined pressure to generate a damping force.
2. The damper according to claim 1, wherein the annular disc is of a floating type which is biased by a spring means.
3. The damper according to claim 1, wherein the annular disc is of a clamp type which is partially clamped.
4. The damper according to claim 1, wherein
the second damping force generation mechanism is disposed outside the annular case member to face the bottom part, and
a second through hole is provided in the bottom part to face the second damping force generation mechanism.

5. The damper according to claim 4, wherein the first through hole is provided on an outer side of the second through hole in the bottom part.

6. The damper according to claim 4, wherein the first through hole is provided on an inner side of the second through hole in the bottom part.

7. The damper according to claim 1, wherein
valve opening of the first damping force generation mechanism is adjusted by a pressure of a case chamber, and
an introduction orifice is provided between the first passage and the case chamber.

8. The damper according to claim 7, wherein a plurality of the introduction orifices are provided in series.

9. The damper according to claim 1, wherein the recess has a shape in which a width in a radial direction of the recess becomes smaller as a depth increases.

10. The damper according to claim 1, wherein the recess has a stopper surface recessed in an axial direction of the annular case member.

11. The damper according to claim 10, wherein a cross section of the stopper surface in a plane including a central axis of the bottom part of the annular case member has a constant arc shape regardless of a circumferential position.

12. The damper according to claim 1, wherein the first through hole is formed at a deepest bottom position of the recess.

* * * * *